US011979532B2

(12) United States Patent
Eiyama et al.

(10) Patent No.: US 11,979,532 B2
(45) Date of Patent: May 7, 2024

(54) READING APPARATUS AND CONTROL METHOD

(71) Applicant: CANON KABUSHIKI KAISHA, Tokyo (JP)

(72) Inventors: Masato Eiyama, Kanagawa (JP); Kazuya Koizumi, Tokyo (JP); Takuya Tsunemi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/339,140

(22) Filed: Jun. 21, 2023

(65) Prior Publication Data

US 2023/0421713 A1 Dec. 28, 2023

(30) Foreign Application Priority Data

Jun. 24, 2022 (JP) ................................. 2022-102064

(51) Int. Cl.
*H04N 1/04* (2006.01)
*H04N 1/00* (2006.01)

(52) U.S. Cl.
CPC ..... *H04N 1/00814* (2013.01); *H04N 1/00602* (2013.01); *H04N 1/00806* (2013.01); *H04N 1/00819* (2013.01); *H04N 1/0097* (2013.01)

(58) Field of Classification Search
None
See application file for complete search history.

(56) References Cited

U.S. PATENT DOCUMENTS

| 7,370,927 | B2* | 5/2008 | Kuruma | B41J 29/38 |
| | | | | 347/14 |
| 2006/0119695 | A1* | 6/2006 | Kojima | B41J 11/007 |
| | | | | 347/164 |
| 2006/0256352 | A1* | 11/2006 | Kogure | B41J 11/007 |
| | | | | 358/1.1 |
| 2012/0206520 | A1* | 8/2012 | Nieda | B41J 29/38 |
| | | | | 347/11 |
| 2014/0078207 | A1* | 3/2014 | Ishida | B41J 13/00 |
| | | | | 347/16 |
| 2018/0109687 | A1* | 4/2018 | Toyoizumi | H04N 1/387 |

FOREIGN PATENT DOCUMENTS

JP 2012000839 A 1/2012

* cited by examiner

*Primary Examiner* — Dung D Tran
(74) *Attorney, Agent, or Firm* — Canon U.S.A., Inc. IP Division

(57) ABSTRACT

A reading apparatus includes a conveyance roller configured to convey a medium, a reading unit configured to read an image of the medium conveyed by the conveyance roller, a detection unit configured to detect a rotation phase of the conveyance roller, a storage unit configured to store index values, each index value being associated with the rotation phase of the conveyance roller and corresponding to a conveyance amount of the conveyance roller per unit rotation angle, and a timing control circuit configured to select the index value based on a detection result of the detection unit and to control a reading timing of the reading unit based on a result of comparing a cumulative value of selected index values with a threshold corresponding to a reading resolution.

20 Claims, 37 Drawing Sheets

| REGION NUMBER | NUMBER OF PULSES AT START OF REGION | |
|---|---|---|
| | HEXADECIMAL NUMBER | DECIMAL NUMBER |
| R0 | 0x0000 | 0 |
| R1 | 0x0640 | 1600 |
| R2 | 0x0C80 | 3200 |
| R3 | 0x12C0 | 4800 |
| R4 | 0x1900 | 6400 |
| ... | ... | ... |
| R31 | 0xC1C0 | 49600 |

| REGION NUMBER | INDEX VALUE (Emag) | |
|---|---|---|
| | HEXADECIMAL NUMBER | DECIMAL NUMBER |
| R0 | 0x1020D7 | 1.0040083 |
| R1 | 0x10184E | 1.0029669 |
| R2 | 0x100BE9 | 1.0014534 |
| R3 | 0x0FFC23 | 0.9995279 |
| R4 | 0x0FE996 | 0.9972639 |
| ... | ... | ... |
| R31 | 0x102531 | 1.0045395 |

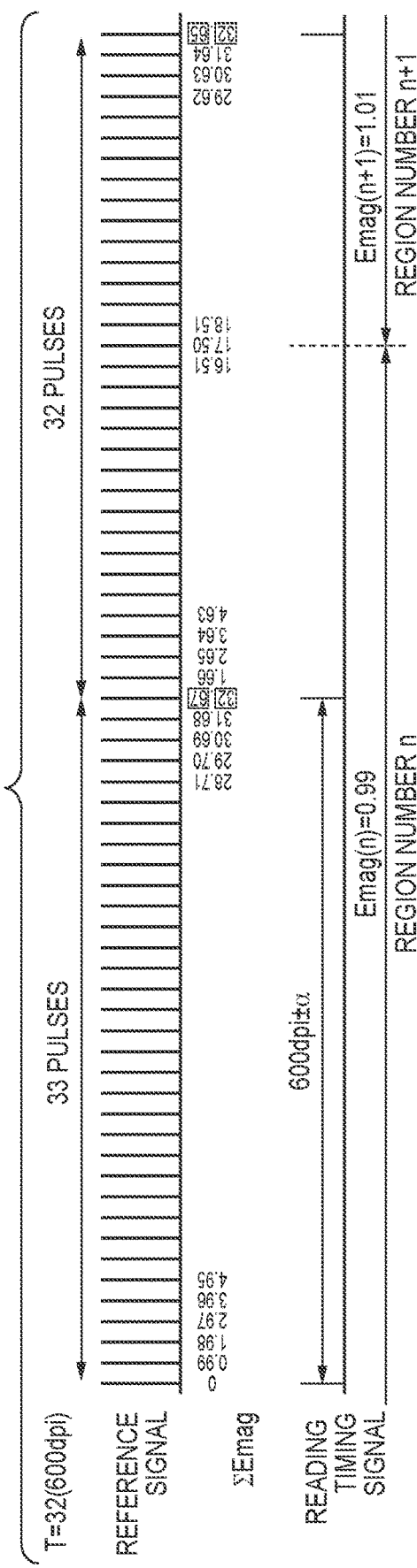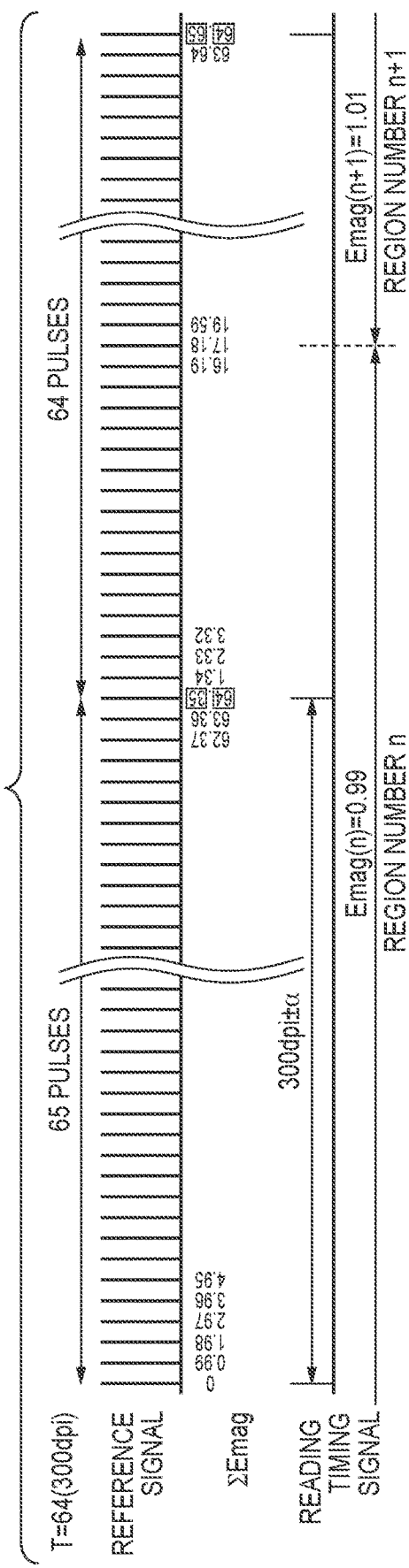

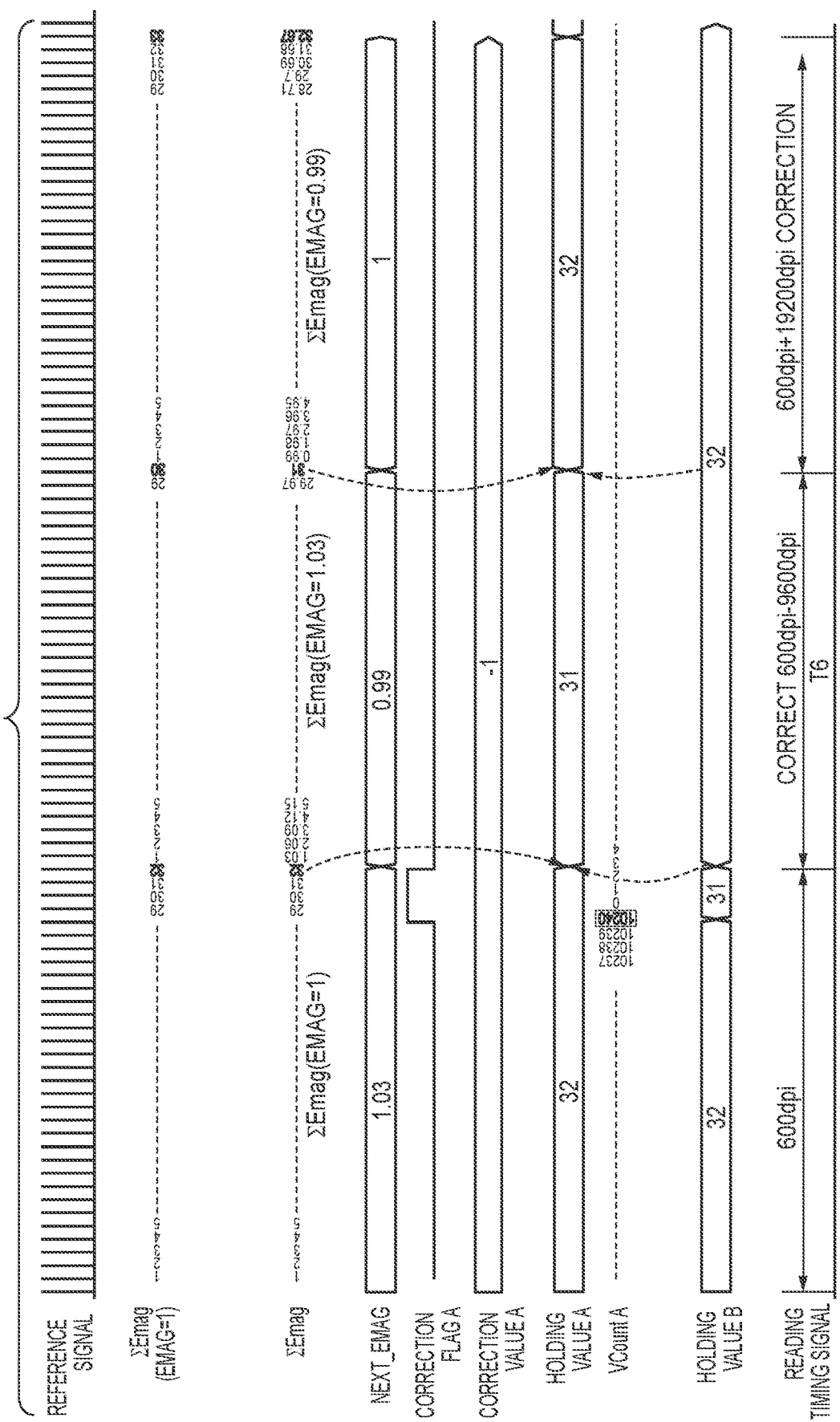

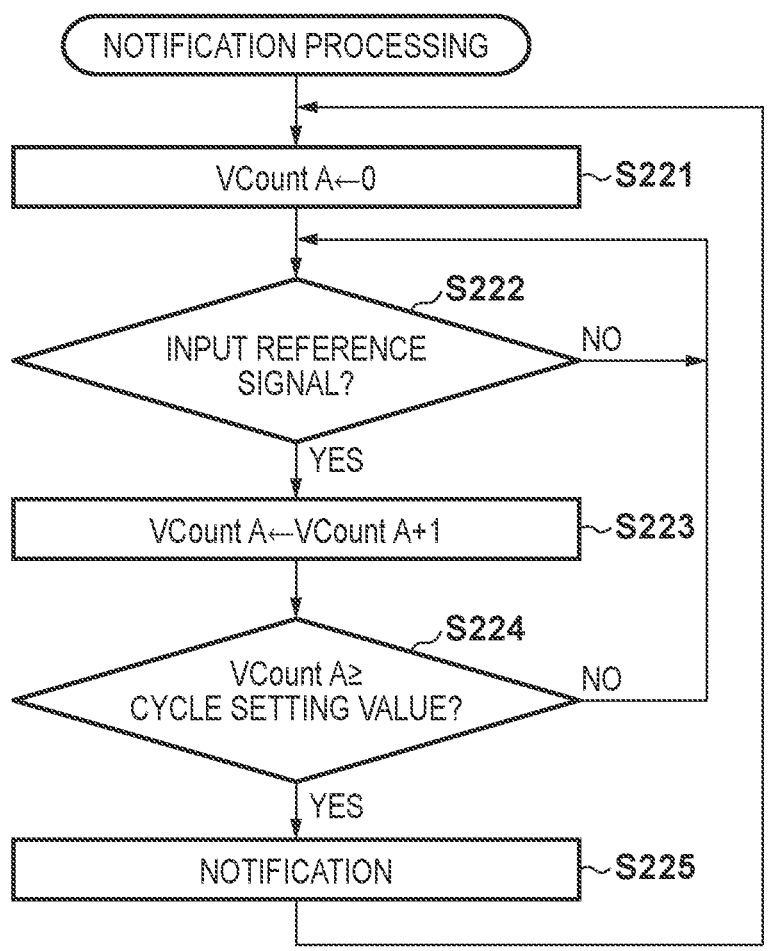

READING APPARATUS AND CONTROL METHOD

BACKGROUND

Field of the Disclosure

The present disclosure relates to a reading apparatus and a control method.

Description of the Related Art

There is known a reading apparatus that reads an image on a sheet-like original while conveying the original. Such reading apparatus detects, by an encoder, the rotation of a conveyance roller that conveys the original. Then, the reading timing of a reading element such as a CCD sensor or CIS is controlled in accordance with a reading resolution from the detection result. On the other hand, a diameter error and eccentricity exist in the conveyance roller. Therefore, an original conveyance amount per unit pulse cycle of the encoder varies, thereby causing a distortion of the read image. Japanese Patent Laid-Open No. 2012-000839 discloses a printing apparatus that focuses on the influence of a diameter error and eccentricity of a conveyance roller with respect to the detection signal of an encoder.

The reading apparatus is required to change the resolution of a read image. It is possible to decrease the resolution of an image read at a fixed resolution by post processing such as image thinning processing or averaging processing. However, it is necessary to read an image at a fixed resolution and to store data of the read image.

SUMMARY

The present disclosure provides embodiments for relatively readily changing a reading resolution while correcting an error of a conveyance roller.

According to an aspect of the present disclosure, there is provided a reading apparatus comprising: a conveyance roller configured to convey a medium; a reading unit configured to read an image of the medium conveyed by the conveyance roller; a detection unit configured to detect a rotation phase of the conveyance roller; a storage unit configured to store index values, each index value being associated with the rotation phase of the conveyance roller and corresponding to a conveyance amount of the conveyance roller per unit rotation angle; and a timing control circuit configured to select the index value based on a detection result of the detection unit and to control a reading timing of the reading unit based on a result of comparing a cumulative value of selected index values with a threshold corresponding to a reading resolution.

Further features of various embodiments will become apparent from the following description of exemplary embodiments (with reference to the attached drawings).

BRIEF DESCRIPTION OF THE DRAWINGS

FIGS. 10A and 10B are timing charts each showing an example of generation of a reading timing signal;
FIG. 34 is a timing chart showing an example of correction of a threshold;
FIG. 38 is a flowchart illustrating an example of processing of the control unit.

DESCRIPTION OF THE EMBODIMENTS

Figure 1A:
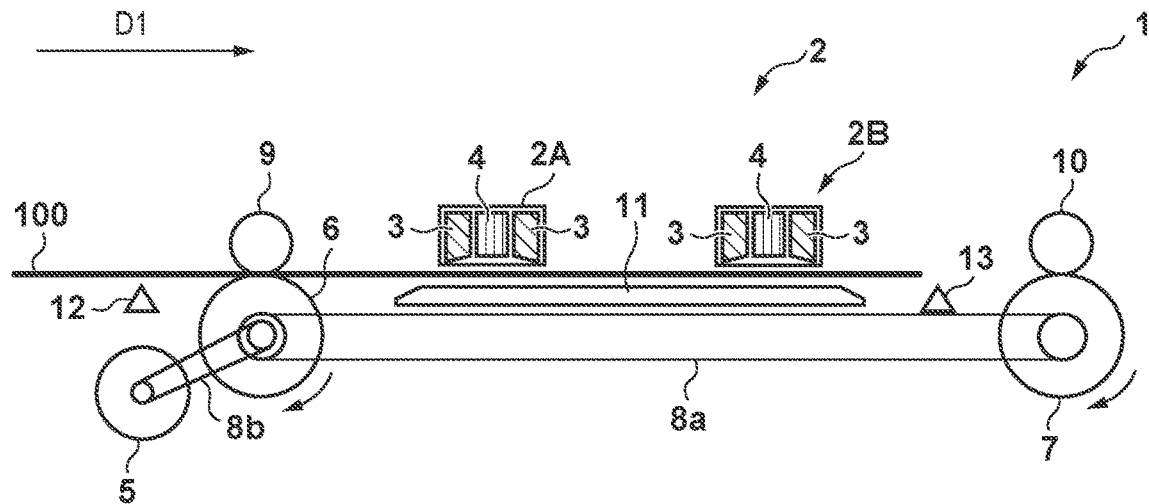
FIG. 1A is a side view of a reading apparatus according to an embodiment of the present disclosure.

Hereinafter, embodiments will be described in detail with reference to the attached drawings. Note, the following embodiments are not intended to limit the scope of the claims. Multiple features are described in the embodiments, but limitation is not made an embodiment that requires all such features, and multiple such features may be combined as appropriate. Furthermore, in the attached drawings, the same reference numerals are given to the same or similar configurations, and redundant description thereof is omitted.

First Embodiment

<Overview of Apparatus>

Figure 1B:
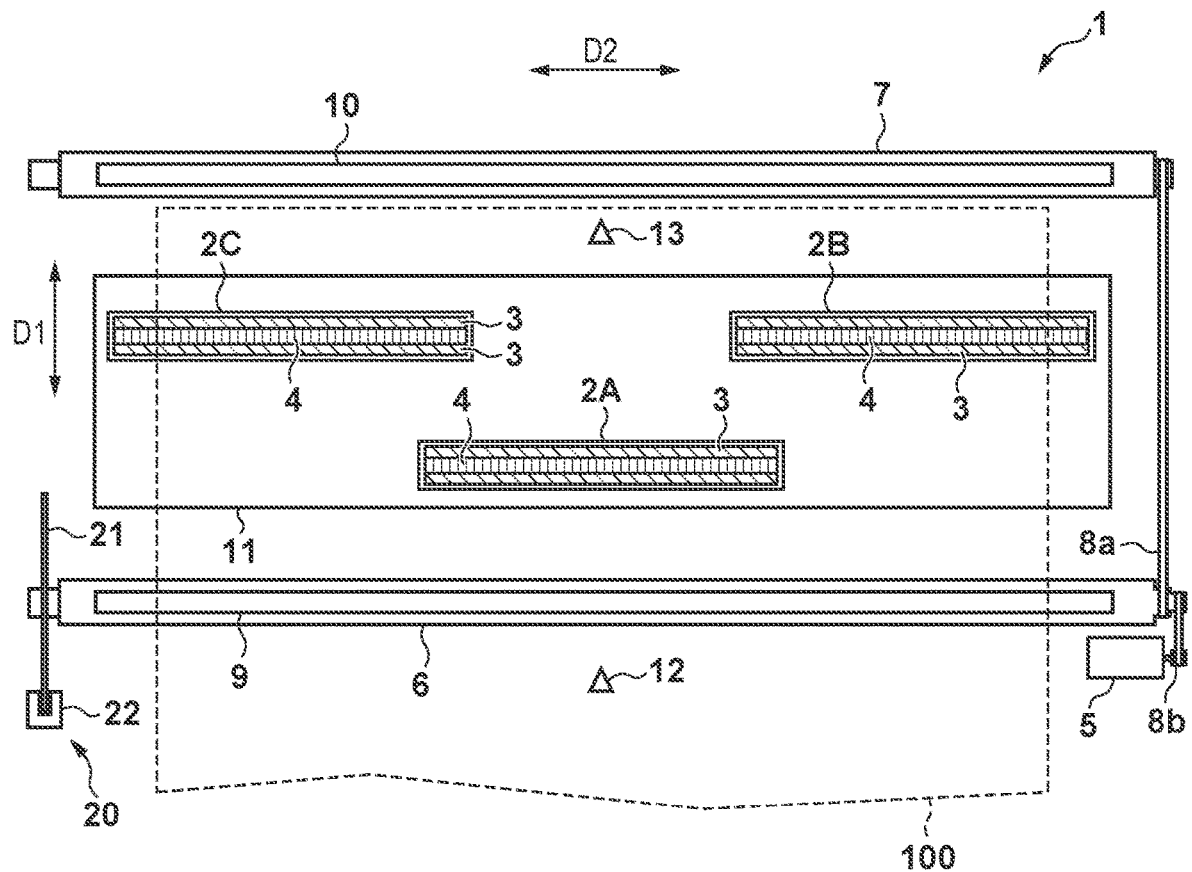
FIG. 1B is a plan view of the reading apparatus according to the embodiment of the present disclosure.

FIGS. 1A and 1B are schematic views of a reading apparatus 1 according to an embodiment of the present disclosure. FIG. 1A is a side view and FIG. 1B is a plan view. The reading apparatus 1 is an apparatus that reads an image of a medium 100. The medium 100 is, for example, a sheet-like original, such as a paper sheet, and examples of the image are a character, a graphic, and a photograph on the medium 100.

The reading apparatus 1 includes, as the conveyance mechanism of the medium 100, conveyance rollers 6 and 7 and nip rollers 9 and 10, and the medium 100 is conveyed in a D1 direction (conveyance direction). A D2 direction is a direction intersecting the D1 direction. In this embodiment, the D2 direction is a direction orthogonal to the D1 direction, and is the widthwise direction of the medium 100. The conveyance rollers 6 and 7 are extended in the D2 direction, and synchronously rotate by a driving force of a conveyance motor 5. The driving force of the conveyance motor 5 is transmitted to the conveyance roller 6 via a transmission belt 8b, and transmitted from the conveyance roller 6 to the conveyance roller 7 via a transmission belt 8a. The conveyance roller 6 is arranged on the upstream side of the conveyance roller 7 in the D1 direction.

The nip rollers 9 and 10 are extended in the D2 direction. The nip roller 9 is in press contact with the conveyance roller 6, and the nip roller 10 is in press contact with the conveyance roller 7. The medium 100 is conveyed in the D1 direction by the rotation of the conveyance roller 6 while the medium 100 is sandwiched between the conveyance roller 6 and the nip roller 9. Similarly, the medium 100 is conveyed in the D1 direction by the rotation of the conveyance roller 7 while the medium 100 is sandwiched between the conveyance roller 7 and the nip roller 10. The medium 100 is conveyed through a state in which it is conveyed by the conveyance roller 6 and the nip roller 9, a state in which it is conveyed by the conveyance roller 6 and the nip roller 9 and the conveyance roller 7 and the nip roller 10, and a state in which it is conveyed by the conveyance roller 7 and the nip roller 10.

A reading unit 2 reads the image of the medium 100 conveyed by the conveyance rollers 6 and 7. In this embodiment, the reading unit 2 includes a plurality of sensing units 2A to 2C. Each of the sensing units 2A to 2C is a contact image sensor (CIS) unit extended in the D2 direction. In each of the sensing units 2A to 2C, a photodiode array 4, LED light sources 3 of two rows, and a lens array (not shown) are arrayed in the D2 direction. The LED light sources 3 are respectively arranged on the upstream side and downstream side of the photodiode array 4 in the D1 direction, and irradiate the medium 100 with light. The photodiode array 4 is arrayed in the D2 direction, and includes a plurality of light receiving elements (reading elements) that receive reflected light from the medium 100. Each LED light source 3 is a three-color LED array including light emitting elements of three colors: Red (R), Green (G), and Blue (B).

The sensing units 2A to 2C are arranged between the conveyance rollers 6 and 7 in the D1 direction. The sensing units 2A to 2C are arranged in a staggered pattern. More specifically, the sensing unit 2A is arranged in a central portion in the D2 direction on the upstream side in the D1 direction with respect to the sensing units 2B and 2C. The sensing units 2B and 2C are arranged at the same position in the D1 direction and separated from each other in the D2 direction. In the D2 direction, the sensing unit 2B is shifted with respect to the sensing unit 2A, and the sensing unit 2C is also shifted with respect to the sensing unit 2A. In the D2 direction, one end portion of the reading region of the sensing unit 2A overlaps an end portion, on the center side, of the reading region of the sensing unit 2B, and the other end portion of the reading region of the sensing unit 2A overlaps an end portion, on the center side, of the reading region of the sensing unit 2C.

In this embodiment, each of the sensing units 2A to 2C includes a reading region having a width of an A4 size. When the sensing units 2A to 2C are arranged in a staggered pattern, it is possible to read the image of the medium 100 having a width wider than the A4 size. In this case, the read images of the sensing units 2A to 2C are combined to generate one image. Note that the reading unit 2 is formed by the plurality of sensing units 2A to 2C in this embodiment but may be formed by one sensing unit.

The sensing units 2A to 2C are arranged to face a white platen 11, and the medium 100 is conveyed between the sensing units 2A to 2C and the platen 11. It is possible to suppress occurrence of an image blur by keeping the distance between the medium 100 and each of the sensing units 2A to 2C constant, and to prevent occurrence of color unevenness of the read images by making the color of the platen 11 uniform.

A leading edge detection sensor 12 that detects the leading edge of the medium 100 as a reading target is arranged on the upstream side of the conveyance roller 6 in the D1 direction. Furthermore, a trailing edge detection sensor 13 that detects the trailing edge of the medium 100 is arranged on the downstream side of the sensing units 2B and 2C and on the upstream side of the conveyance roller 7 in the D1 direction. Each of the leading edge detection sensor 12 and the trailing edge detection sensor 13 is, for example, an optical sensor.

The reading apparatus 1 includes a detection unit 20 that detects the rotation phase of the conveyance roller 6. The arrangement of the detection unit 20 will be described with reference to FIG. 2A as well. The detection unit 20 includes a code wheel 21 coaxially fixed to the shaft of the conveyance roller 6, an optical encoder sensor 22, and an optical HP (home position) sensor 23. The code wheel 21 has a disc shape, and makes one revolution per revolution of the conveyance roller 6. A slit portion 21a in which a number of slits are formed at an equal pitch in the circumferential direction is formed at the outer peripheral edge of the code wheel 21, and a non-transmission region 21b is formed inside the slit portion 21a within a range of 180° in the circumferential direction. The non-transmission region 21b is a region that blocks transmission of light (the remaining portion is a transmission region that transmits light).

Figure 3:
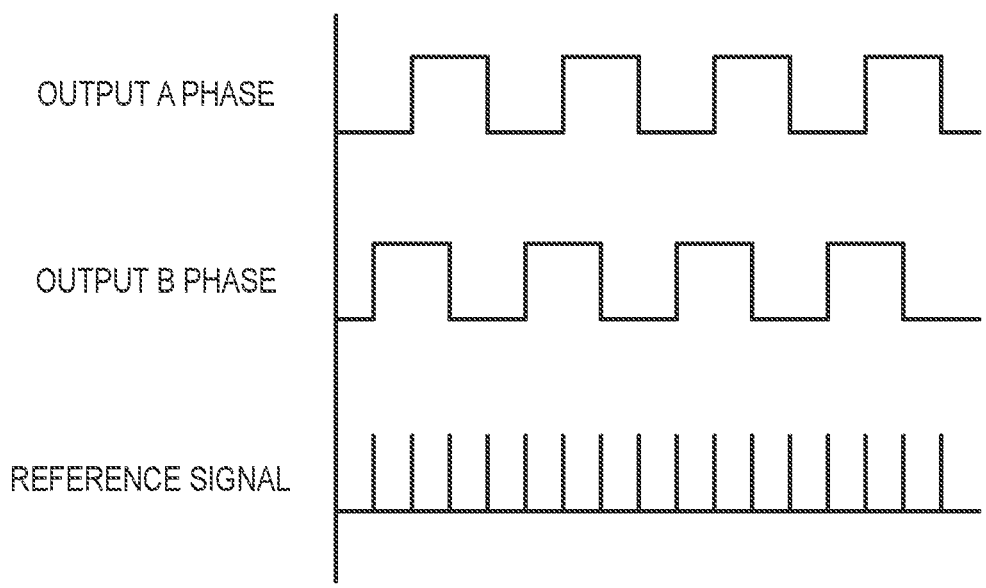
FIG. 3 is an explanatory view of a reference signal.

The output signal of the encoder sensor 22 is switched between Hi and Low levels when the slit of the slit portion 21a passes through the encoder sensor 22. If the conveyance roller 6 rotates and the code wheel 21 accordingly rotates, the encoder sensor 22 outputs a 2-phase pulse of the A phase and B phase, as shown in FIG. 3. Each rising edge of the 2-phase pulse is set as a reference signal. In this embodiment, if the code wheel 21 makes one revolution, the number of reference signals (the number of pulses) is 51,200 pulses. Therefore, the reference signal is output per rotation of 360°/51200 as a unit rotation angle. If the conveyance roller 6 is an ideal roller having a perfectly circular cross section without eccentricity, the conveyance amount of the medium 100 by a rotation angle (360°/512000.007°) corresponding to one pulse is given by conveyance amount=perimeter of conveyance roller 6/51200.

To specify the rotation phase of the conveyance roller 6, it is necessary to set a rotation position as a reference. The output signal of the HP sensor 23 is switched between Hi and Low levels when the non-transmission region 21b passes through the HP sensor 23 (to be referred to as a reset signal hereinafter). A rotation position at which the non-transmission region 21b passes through the HP sensor 23 (a ration position at which the output of the HP sensor 23 is switched) is set as a reference position (in other words, the home position of the conveyance roller 6).

<Control Circuit>

Figure 4:
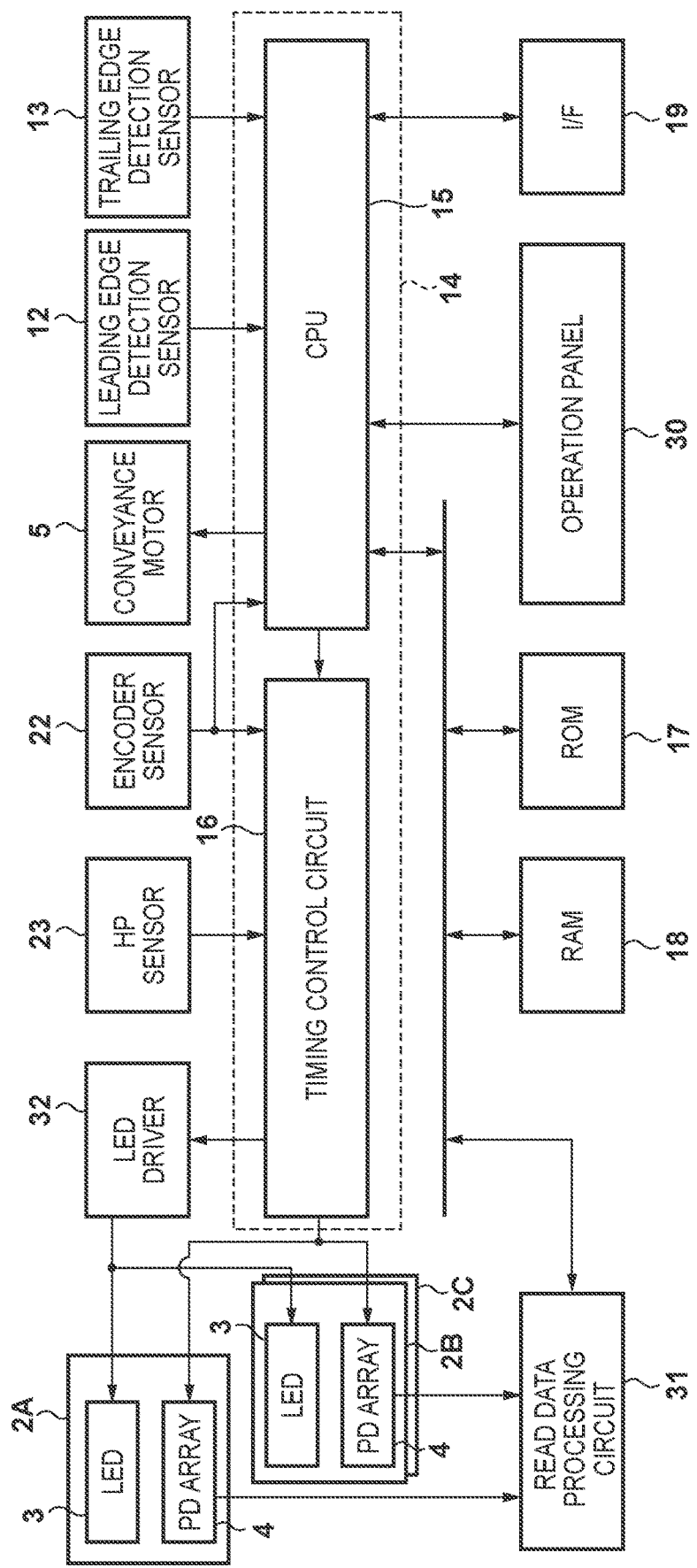
FIG. 4 is a block diagram of a control circuit.

A control circuit provided in the reading apparatus 1 will be described with reference to FIG. 4. The reading apparatus 1 includes a control unit 14. The control unit 14 includes a CPU 15 as a processor that executes processing (to be described later), and a timing control circuit 16 that controls the reading timing of the reading unit 2, and controls the reading apparatus 1. The CPU 15 is connected to at least one storage device (e.g., a ROM 17, a RAM 18). The storage device stores a program to be executed by the CPU 15 and various data, and the RAM 18 provides a work area of the CPU 15.

If the leading edge detection sensor 12 detects that the medium 100 is set, the CPU 15 starts to drive the conveyance motor 5, and causes the timing control circuit 16 to start to generate a reading timing signal. The timing control circuit 16 generates a reading timing signal based on the reference signal. The reading timing signal is input to an LED driver 32.

Upon receiving the reading timing signal, the LED driver 32 causes the LED light source 3 to emit light. The LED light source 3 is a three-color LED array including light emitting elements of three colors—Red (R), Green (G), and Blue (B)—and causes, upon receiving the reading timing signal, the light emitting elements to emit light beams in order of R→G→B. In synchronous with the light emission of each light emitting element, the photodiode array (PD array) 4 is exposed to receive reflected light from the medium 100. A voltage output from each light receiving element of the photodiode array 4 changes in accordance with the intensity of the received light. The output voltage is input to a read data processing circuit 31. The read data processing circuit 31 includes an A/D converter, and converts the output voltage into a digital signal. The read data processing circuit 31 buffers the A/D-converted output voltage as read data for each pixel in the RAM 18. The read data are distinguished by the sensing units 2A to 2C and saved.

By repeating such reading operation of one line in the D2 direction from the leading edge portion to the trailing edge portion of the medium 100 in the D1 direction, image data of the read image are accumulated in the RAM 18. If conveyance of the medium 100 advances and the trailing edge detection sensor 13 detects passing of the trailing edge of the medium 100, the CPU 15 issues, to the timing control circuit 16, a command to stop the generation of the reading timing signal. After the medium 100 is conveyed by a distance corresponding to a portion from the trailing edge detection sensor 13 to the conveyance roller 7, the CPU 15 stops the conveyance motor 5. This ends one reading operation.

If the reading operation ends, the images read by the sensing units 2A to 2C are combined to generate one image. More specifically, the images read by the sensing units 2B and 2C are offset by the number of lines corresponding the distance in the D1 direction between the sensing unit 2A and the sensing units 2B and 2C, and superimposed on the image read by the sensing unit 2A. This forms one image. At this time, processing of making the joint portions of the images unnoticeable may be performed on pixel regions where the read image of the sensing unit 2A overlaps the read images of the sensing units 2B and 2C. For example, gradation processing or processing of averaging the data between pixels is performed. Upon completion of the formation of the image, information indicating that reading is complete may be displayed on an operation panel 30, such as a touch panel. Furthermore, the image data may be transmitted to another device, such as the PC of the user, via an interface (UF) 19.

Note that the example of combining the images read by the sensing units 2A to 2C after the end of the reading of the medium 100 has been explained. However, the images may be combined simultaneously with the reading.

<Error Correction of Conveyance Roller>

If the conveyance roller 6 is an ideal roller having a perfectly circular cross section without eccentricity, the number of pulses of the reference signal matches the conveyance amount of the medium 100 by the conveyance roller 6. If it is specified, from the number of pulses of the reference signal, that the medium 100 is conveyed by a conveyance amount corresponding to a desired reading resolution, and the reading operation of the reading unit 2 is executed, it is possible to obtain read images at the reading resolution.

However, in fact, a diameter error and eccentricity exist in the conveyance roller 6. Therefore, there is a difference between the number of pulses of the reference signal and the conveyance amount of the medium 100. If an error is cyclic as in a case where the conveyance roller 6 is eccentric, the conveyance amount varies due to the rotation phase by setting one revolution of the conveyance roller 6 as one cycle. Thus, the read image may be distorted. As in this embodiment, if the sensing units 2A to 2C are arranged while being shifted in the D1 direction, when combining the read images of the sensing units, a cyclic image shift occurs in each overlapping portion of the read images. To cope with this, in this embodiment, the reading timing signal is generated from the reference signal by correcting the error of the conveyance roller 6.

Figures 2A, 2B:
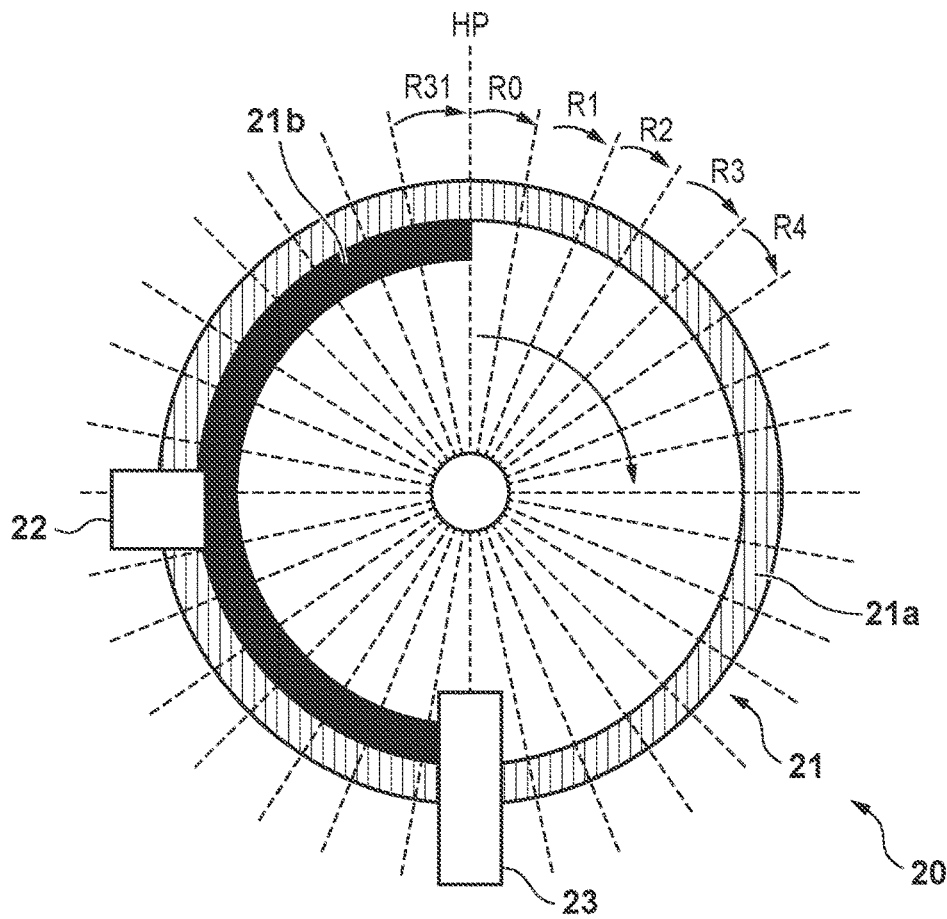
FIG. 2A is an explanatory view of a detection unit.
FIG. 2B is an explanatory table of phase regions.

As shown in FIGS. 2A and 2B, the code wheel 21 is divided into a plurality of rotation phase regions at an equal pitch in the circumferential direction, and an amount of correction per pulse of the reference signal is set for each phase region. The division number is not particularly limited but the code wheel 21 is equally divided into 32 phase regions in this embodiment. To specify each phase region, region numbers R0 to R31 are sequentially assigned from the reference position. Each region is distinguished by the number of pulses of the reference signal. The phase region R0 is a range from the reference position to 1,599 pulses. The phase region R1 is a range from the 1,600 pulses to 3,199 pulses. A unit phase region will sometimes be represented as a phase region R.

The amount of correction is defined by an index value corresponding to the conveyance amount of the conveyance roller 6 per unit rotation angle. In this embodiment, the unit rotation angle is a rotation angle (360°/512000.007°) corresponding to one pulse. In this embodiment, to count the number of pulses of the reference signal, the index value is converted into a numerical value in the form of a correction value for correcting one count amount. For the sake of easy understanding, a virtual practical example will be described.

Assume that to achieve a desired reading resolution, the reading operation of the reading unit 2 is performed once every time the medium 100 is conveyed by 10 mm. Assume also that if the conveyance roller 6 is an ideal roller, 1,000 pulses of the reference signal are output by conveying the medium 100 by 10 mm. If the count value of the reference signal reaches 1,000, the reading timing signal need only be output once.

However, assume that if 1,000 pulses of the reference signal are output, the medium 100 is actually conveyed by 11 mm due to eccentricity of the conveyance roller 6. In this case, if the reading timing signal is output once when the count value of the reference signal reaches 1,000, reading is performed at a resolution lower than the desired reading resolution. To cope with this, one pulse of the reference signal is counted as, for example, 1.101. This value is set as an index value. If 909 pulses of the reference signal are output, the count value is given by 909×1.101=1000.81 (>1000), and the reading timing signal is output once. At this time, the conveyance amount of the medium 100 is given by 11 mm×909/1000=9.999 mm, which is substantially 10 mm. In this way, error correction of the conveyance roller 6 can be performed.

The index value is set for each of the phase regions R0 to R31. The index value to be set can be calculated in advance using a specific calibration chart, and saved in the ROM 17. An example of index value setting processing will be described below.

Setting Example of Index Value

Figure 5A:
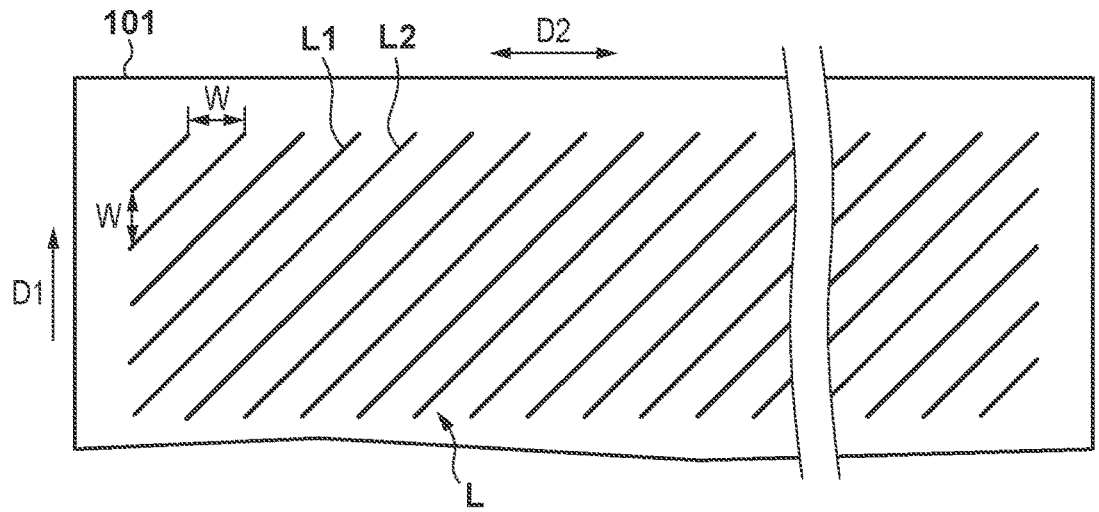
FIG. 5A is an explanatory view of a calibration chart.

FIG. 5A is an explanatory view of a calibration chart 101. The chart 101 is formed by a plurality of thin lines L printed on a sheet. Each thin line L is a line inclined by 45° with respect to the D1 direction, and the interval in each of the D1 and D2 directions between the adjacent thin lines L is a distance W. This embodiment assumes that the highest reading resolution of the reading apparatus 1 is 600 dpi. 50 lines correspond to one phase region (1,600 pulses), and W=(1 inch/600)×50.

With the thus formed chart 101, if the conveyance roller 6 is an ideal roller, the same position in the D2 direction of the adjacent thin lines L is located on the identical pixels (light-receiving elements) of the sensing units 2A to 2C by conveying the chart 101 by a distance corresponding to the phase region R. A practical example will be described.

Figure 5B:
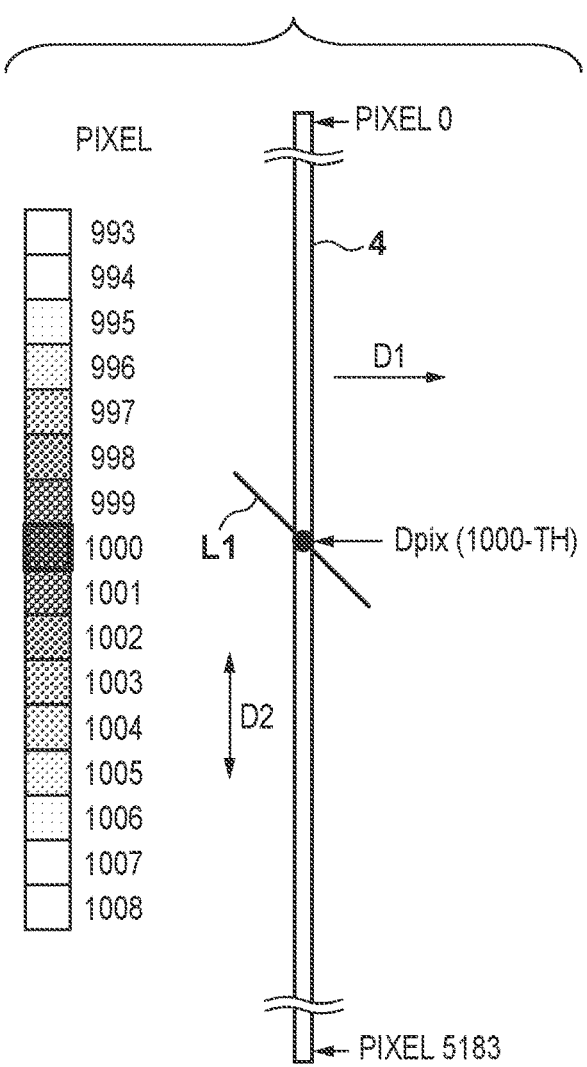
FIG. 5B is a view showing an example of a result of reading the chart.

FIG. 5B shows, for example, the detection result of the sensing unit 2B. This example exemplifies a case where, if the conveyance roller 6 is located at the home position, a thin line L1 (see FIG. 5A) is located on the 1000th pixel (light-receiving element) of the photodiode array 4. Since the thin line L1 overlaps the 1000th pixel, the amount of reflected light is smallest in the 1000th pixel, and the output voltage is low.

Figure 6A:
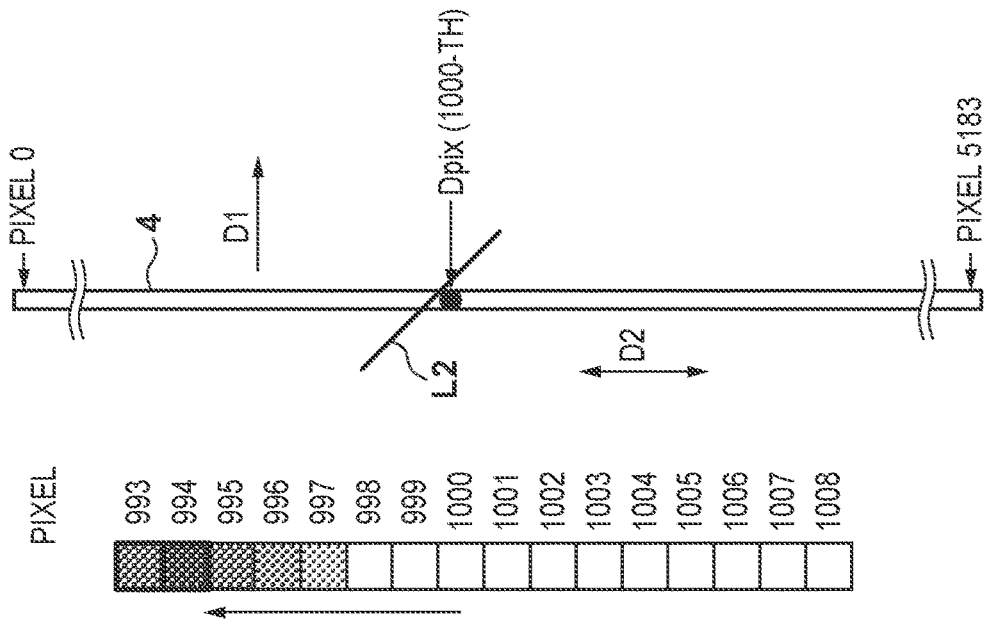
FIGS. 6A and 6B are views each showing an example of a result of reading the chart.

FIG. 6A exemplifies a case where, if the conveyance roller 6 is an ideal roller, the chart 101 is conveyed by 50 lines from the state shown in FIG. 5B. That is, the conveyance roller 6 rotates from the start to the end of the phase region R0. In this case, a thin line L2 (see FIG. 5A) adjacent to the thin line L1 overlaps the 1000th pixel, and the amount of reflected light is smallest in the 1000th pixel, as in the example shown in FIG. 5B.

Figure 6B:
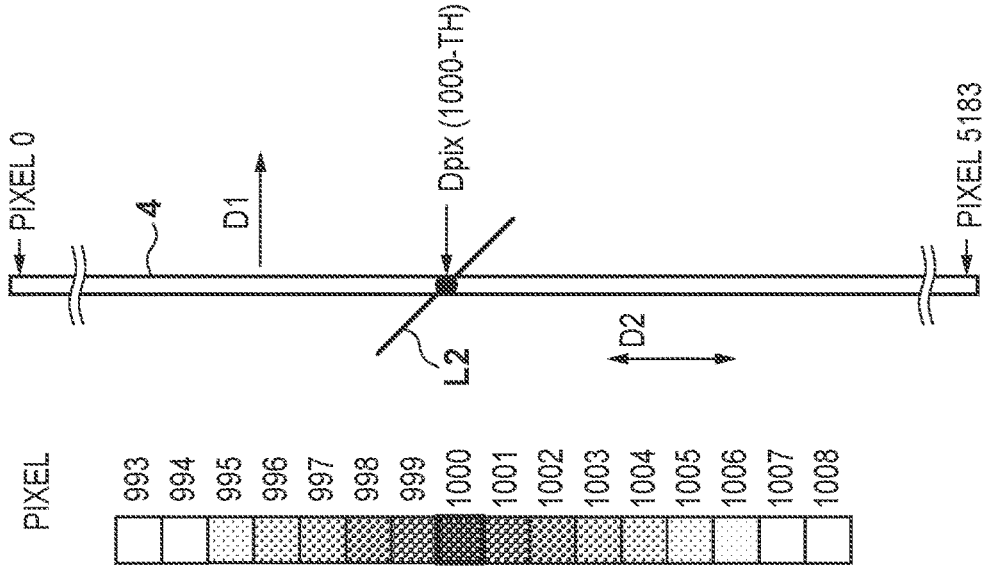

FIG. 6B exemplifies a case where if the conveyance roller 6 is eccentric, the chart 101 is conveyed by 50 lines from the state shown in FIG. 5B. In this case as well, the conveyance roller 6 rotates from the start to the end of the phase region R0. A pixel overlapping the thin line L2 shifts, and a portion between the 993rd pixel and the 994th pixel overlaps the thin line L2. This indicates that the chart 101 is conveyed about 6 pixels more with the same rotation amount, as compared with a case where the conveyance roller 6 is an ideal roller.

Figures 7A, 7B:
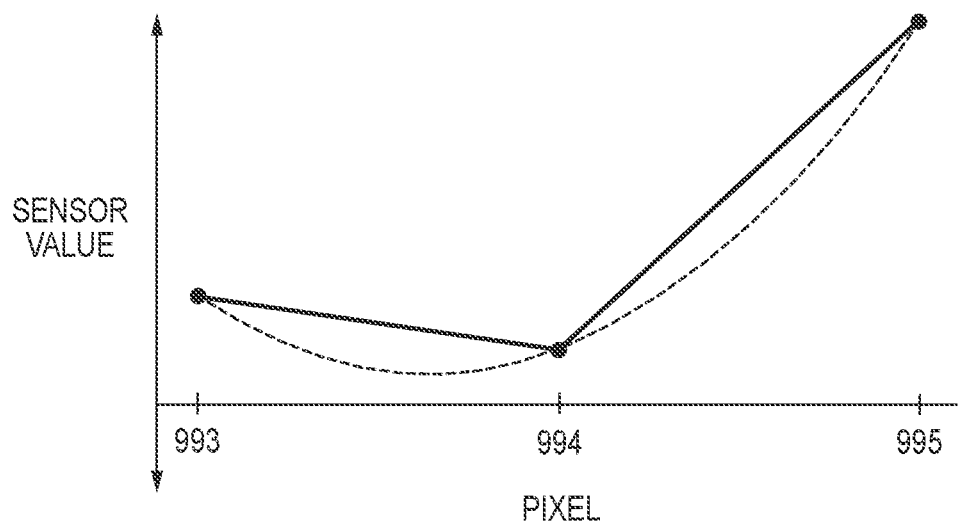
FIG. 7A is a graph showing specific examples of pixels.
FIG. 7B is a table showing examples of an index value.

The index value is calculated from this shift amount. More specifically, as shown in FIG. 7A, the three values of a pixel (in this example, the 994th pixel) in which the amount of reflected light is smallest and its adjacent 993rd and 995th pixels are used to obtain a quadratic approximate curve. Then, a pixel whose value is the minimum value of the approximate curve is obtained. In the example shown in FIG. 7A, the pixel with the minimum value is calculated as 993.612. Therefore, this is shifted by 6.38 pixels from the 1000th pixel, and the chart 101 is conveyed more by the shift amount. That is, a conveyance magnification is 1.004. In this embodiment, the magnification value of 1.004 is used as the index value of the region R0. By performing the same calculation processing for all the phase regions R0 to R31, the index values of all the phase regions are calculated. The calculation results are saved in the ROM 17. FIG. 7B shows an example of the saved information. In the example shown in FIG. 7B, the index value is set for each of the phase regions R0 to R31. Both a decimal number and a hexadecimal number are described. The saved index value can be a 24-bit fixed-point value formed from a 4-bit integer part and a 20-bit fraction part.

Figure 8:
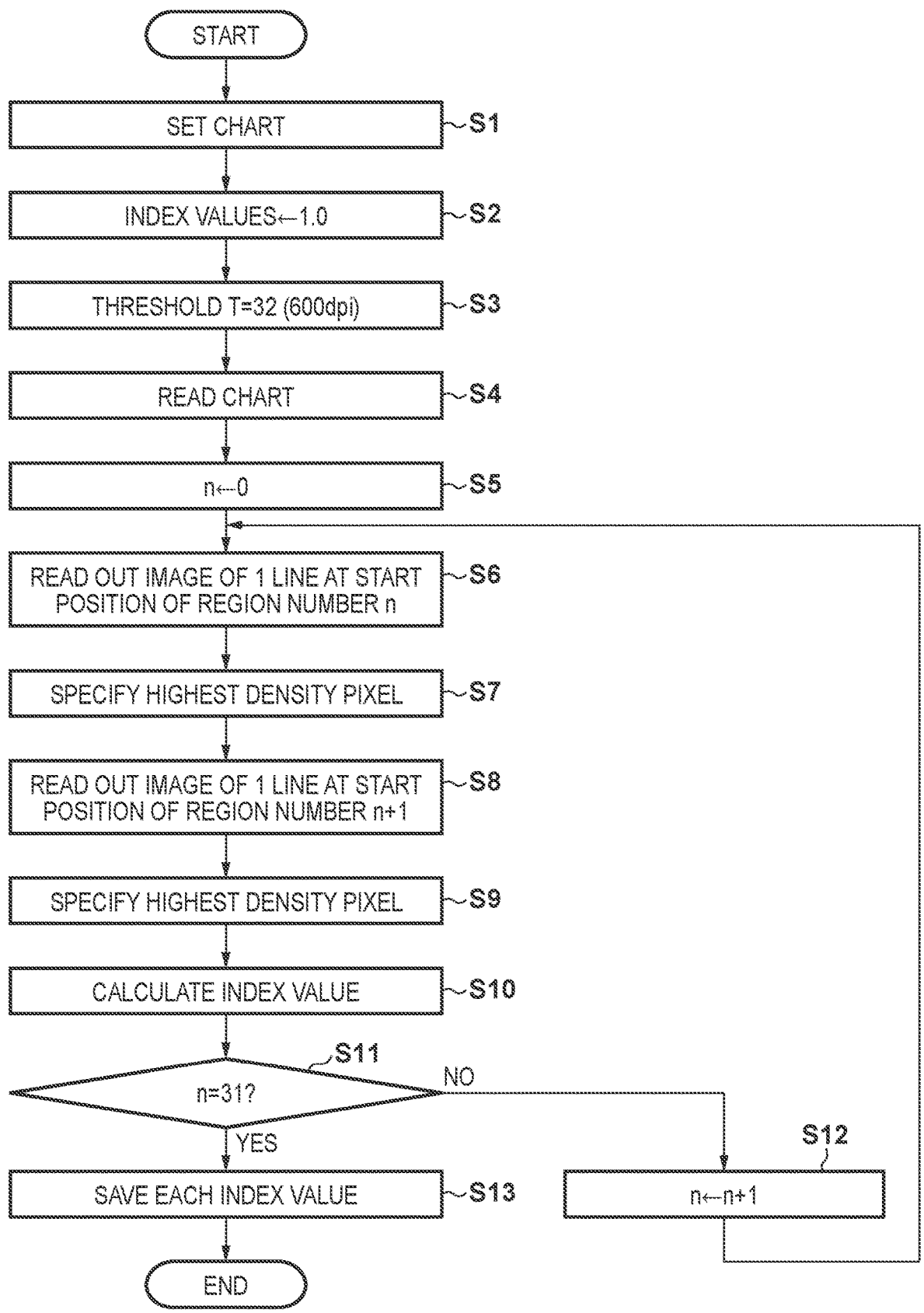
FIG. 8 is a flowchart illustrating an example of processing of a control unit.

FIG. 8 shows an example of processing executed by the control unit 14, and particularly shows an example of index value setting processing mainly executed by the CPU 15. The setting processing aims for error correction of the conveyance roller 6, and thus need only be performed once at the start of first use of the reading apparatus 1. However, the setting processing may be performed after the first use to update the index values. An update timing may be after replacing the conveyance roller 6. Also, a lapse of a predetermined time or reaching a predetermined number of reading operations may be set as a condition regardless of the presence or absence of a replacement.

In step S1, the user sets the chart 101 on the reading apparatus 1, and the leading edge detection sensor 12 detects it. In step S2, the index values of all the phase regions are temporarily set to 1.0. This is done not to correct a reading timing by the index value in an operation of calculating the index value.

In step S3, a threshold T corresponding to a reading resolution is set. In this example, a threshold corresponding to the highest reading resolution of the reading apparatus 1 is set. In this embodiment, assume that the highest reading resolution is 600 dpi and the corresponding threshold T is 32. The threshold T=32 means that a reading timing signal of 600 dpi is generated by dividing the reference signal into 32 signals with respect to a paper resolution of 19,200 dpi of the medium.

In step S4, the chart 101 is read. Every time the number of pulses of the reference signal is counted 32 times while conveying the chart 101 by the conveyance rollers 6 and 7, a reading timing signal is generated to perform reading by the reading unit 2. Since the index values are set to 1.0, a reading timing signal is generated every time the number of pulses of the reference signal is counted 32 times for all the phase regions. The read images are sequentially saved in the RAM 18 to be referred to after the completion of the reading.

After the completion of the reading, the process shifts to index value calculation processing. In step S5, a variable n representing the number of the phase region is set to 0. In step S6, the reading result of one line corresponding to the start position of the phase region Rn is read out from the RAM 18. For example, if n=0, the reading result of one line at the start position of the phase region R0 is read out. In step S7, in the readout image of the one line, a pixel in which the density is highest (the light receiving amount is smallest) is specified. A variable representing the number of the specified pixel is represented by Dpix.

In step S8, the reading result of one line corresponding to the start position of the phase region Rn+1 is read out from the RAM 18. For example, if n=0, the reading result of one line at the start position of the phase region R1 is read out. In step S8, in the readout image of the one line, a pixel in which the density is highest (the light receiving amount is smallest) is specified among pixels on the periphery of Dpix. A variable representing the number of the specified pixel is represented by Dpix'. When searching for Dpix', for example, with reference to Dpix, a search may be sequentially executed from an adjacent pixel of Dpix in a direction away from Dpix, or may be sequentially executed from a pixel away from Dpix by a predetermined value in a direction to approach Dpix.

In step S10, the index value of the phase region Rn is calculated. A quadratic approximate curve is obtained from three pixels including the preceding and succeeding pixels of Dpix, as exemplified in FIG. 7A, thereby obtaining the minimum value of the approximate curve. Similarly, a quadratic approximate curve is obtained from three pixels including the preceding and succeeding pixels of Dpix', as exemplified in FIG. 7A, thereby obtaining the minimum value of the approximate curve. If Dif represents the difference between the two minimum values, an index value Emag(n) of the phase region Rn is obtained by:

$$Emag(n)=1+((Dpix-Dpix')/1600)$$

where 1600 indicates the number of pulses of the reference signal of the unit phase region R.

In step S11, it is determined whether n=31 (whether setting of the index value is complete for all the phase regions). If it is not determined that n=31, the process advances to step S12 to increment n by one, and then returns to step S6. In step S13, the calculated index value is saved in the ROM 17 for each phase region R. The saved information is as exemplified in FIG. 7B. Then, the process ends.

<Control of Reading Timing>

Figure 9:
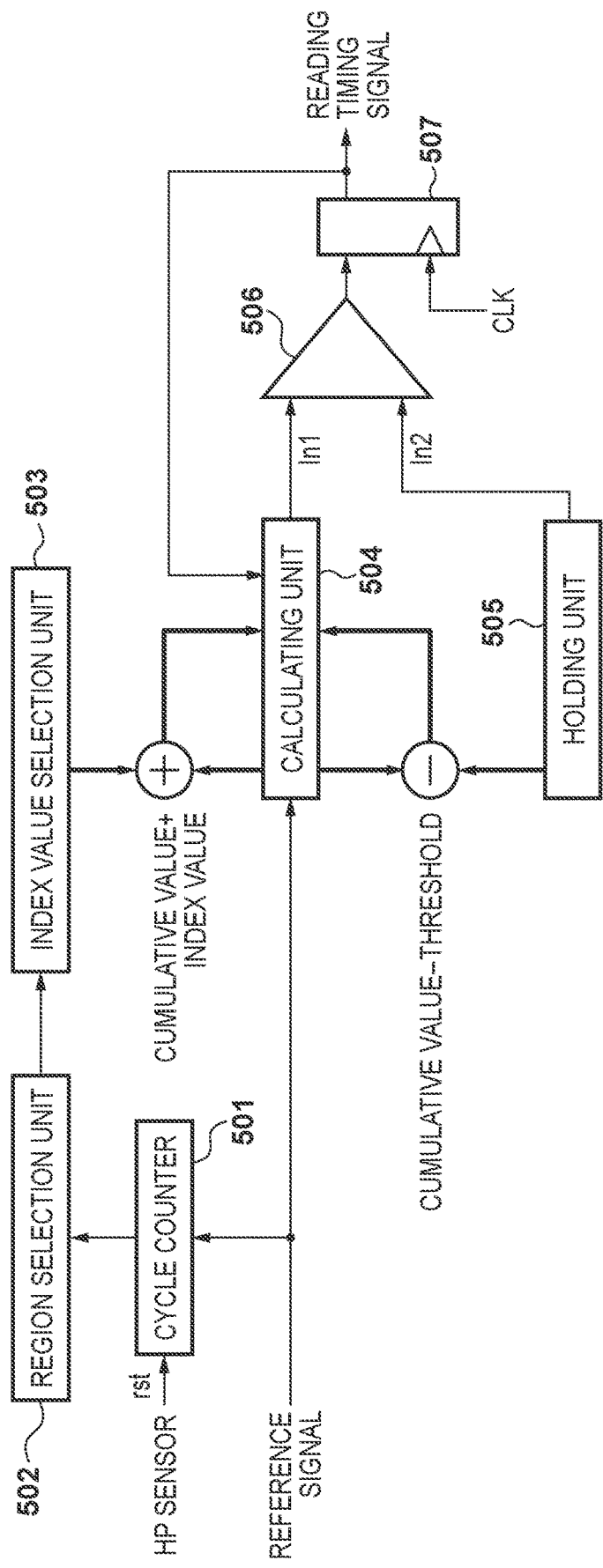
FIG. 9 is a functional block diagram of a timing control circuit.

Control of the reading timing using the index value will be described. FIG. 9 is a functional block diagram of the timing control circuit.

The timing control circuit 16 receives the reference signal from the encoder sensor 22 and the reset signal from the HP sensor 23. A cycle counter 501 operates as a counter that counts up the count value every time the reference signal is input, and clears the count value when the reset signal is input. A region selection unit 502 selects the current phase region R with reference to the count value of the cycle counter 501. An index value selection unit 503 selects an index value Emag corresponding to the phase region R selected by the region selection unit 502, and acquires it from the ROM 17.

A calculation unit 504 adds the index value selected by the index value selection unit 503 to the current cumulative value every time the reference signal is input. The calculation unit 504 subtracts the threshold T held in a holding unit 505 from the current cumulative value every time the reading timing signal is output. The CPU 15 sets the threshold T corresponding to the reading resolution in the holding unit 505. The calculation unit 504 outputs the current cumulative value to a comparison unit 506.

The comparison unit 506 compares the cumulative value output from the calculation unit 504 with the threshold T held in the holding unit 505, and outputs, to a D flip-flop 507, a signal of L level if the cumulative value is smaller than the threshold T and a signal of H level if the cumulative value is equal to or larger than the threshold T. The output signal of the comparison unit 506 is held in the D flip-flop 507 during a predetermined clock (CLK) period. A signal of H level output from the D flip-flop 507 is output as the reading timing signal.

If the reading timing signal is output, the calculation unit 504 subtracts the threshold T from the current cumulative value, and thus the output signal of the comparison unit 506 is set to L level. The reading timing signal is output during only one clock (CLK) period.

The timing control circuit 16 repeats this operation, thereby making it possible to generate a reading timing signal corresponding to the desired resolution and the medium conveyance amount. FIG. 10A is a timing chart showing an example of the change of the reference signal, the cumulative value (ΣEmag), the index value (Emag), and the reading timing signal in a case where the reading resolution is 600 dpi (threshold T=32).

In the example shown in FIG. 10A, the index value for the phase region Rn is set to 0.99. Every time the reference signal is input, 0.99 is added to the cumulative value (ΣEmag), and the cumulative value (32.67)>the threshold T is obtained when 33 pulses are input. At this timing, the reading timing signal is output, and the threshold T is subtracted from the cumulative value (ΣEmag=0.67).

After that, every time the reference signal is input, 0.99 is added to the cumulative value (ΣEmag). However, if the phase region R changes from the phase region Rn to the phase region Rn+1, the index value changes to 1.01, and 1.01 is added to the cumulative value (ΣEmag). If the cumulative value (ΣEmag)=32.65 is obtained, the reading timing signal is output again. In this way, the reading timing signal is generated. Since the reading timing signal is generated based on the magnification of the actual conveyance amount of the medium 100 with respect to the reference signal, the cycle of the reading timing signal corresponds to the actual moving distance of the medium 100. In this embodiment, when outputting the reading timing signal, the threshold T is subtracted from the cumulative value. Therefore, even if the conveyance amount is large, an error is difficult to occur.

If the reading resolution is changed, the threshold T is changed, and the index value is used intact. It is possible to output the reading timing signal corresponding to various cycles by changing the threshold T. Note that since the cycle of the reading timing signal is changed in the resolution unit of the cycle of the reference signal, the smallest threshold T is set for 600 dpi (T=32) and jitter that occurs is 1/32=3.125%. Jitter can be reduced by shortening the cycle of the reference signal with respect to the cycle of the reading timing signal.

FIG. 10B shows an example in which the reading resolution is 300 dpi. The threshold T is set to 64. The index value for the phase region Rn is set to 0.99. Every time the reference signal is input, 0.99 is added to the cumulative value (ΣEmag), and the cumulative value (64.35)>the threshold T is obtained when 65 pulses are input. At this timing, the reading timing signal is output, and the threshold T is subtracted from the cumulative value (ΣEmag=0.35).

After that, every time the reference signal is input, 0.99 is added to the cumulative value (ΣEmag). However, if the phase region R changes from the phase region Rn to the phase region Rn+1, the index value changes to 1.01, and 1.01 is added to the cumulative value (ΣEmag). If the cumulative value (ΣEmag)=64.65 is obtained, the reading timing signal is output again. In this way, the reading timing signal is generated. Note that the read pixels of the one line may be changed in accordance with the reading resolution, or may be read without any change and then thinned out.

Example of Reading Control

Figure 11:
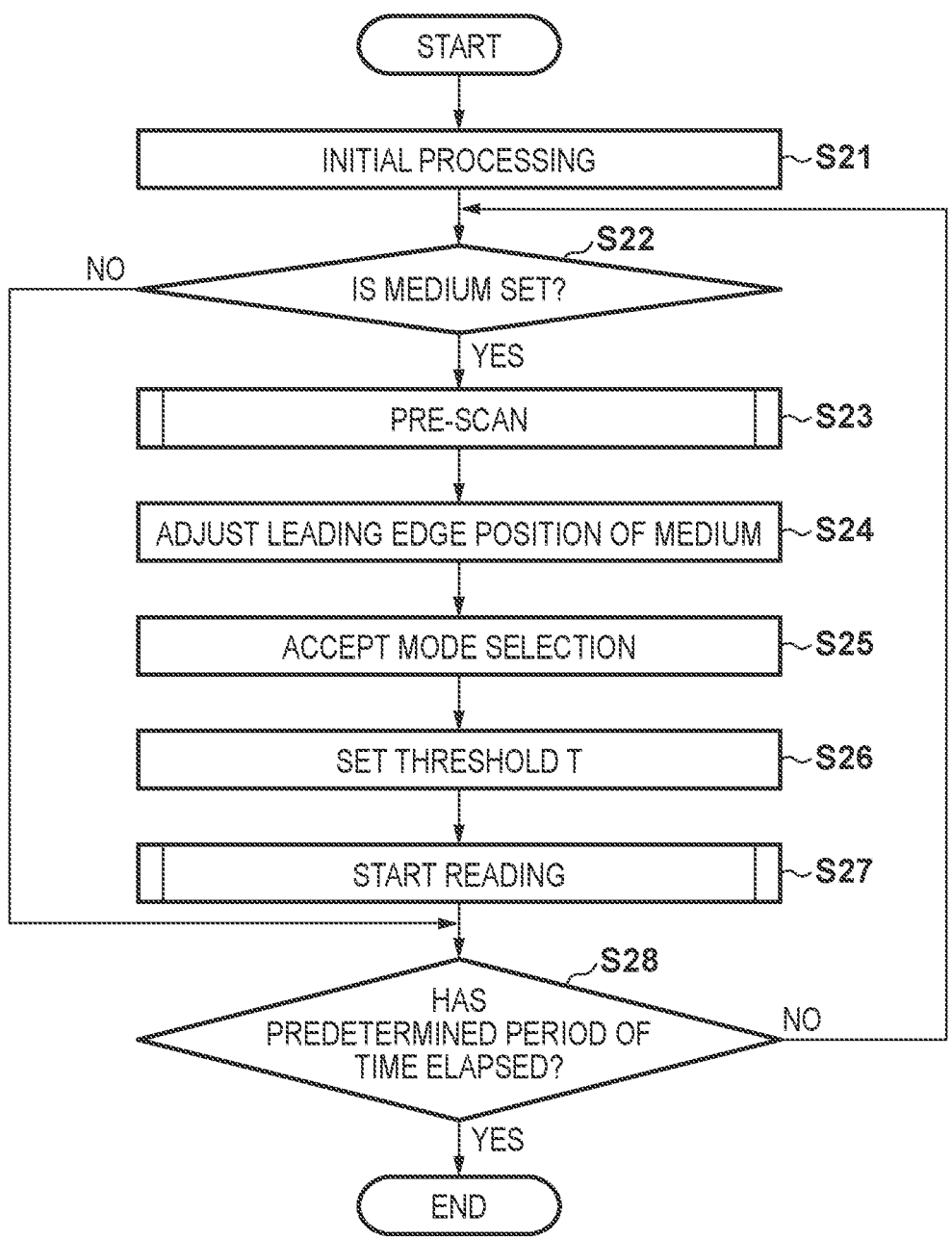
FIG. 11 is a flowchart illustrating an example of processing of the control unit.

FIG. 11 shows an example of processing executed by the control unit 14, and shows an example of processing at the time of reading the medium 100. In the example of the processing, each process is mainly executed by the CPU 15. If the reading apparatus 1 is activated, initial processing is executed in step S21. In the initial processing, the index value of each phase region R saved in the ROM 17 is read out and set in the index value selection unit 503. After the count value of the cycle counter 501 is cleared, a count start is set. If the count start is set, the cycle counter 501 repeats an operation of counting up the count value every time the reference signal is input and resetting the count value when the reset signal is input.

In the initial processing, the conveyance motor 5 is driven to position the conveyance roller 6 at the home position. This is an operation for associating the conveyance roller 6 with the phase region R, and need only be performed once after activation.

In step S22, based on the detection result of the leading edge detection sensor 12, it is determined whether the medium 100 as a reading target is set. If it is determined that the medium 100 is set, the process advances to step S23. In step S23, a pre-scan operation of the medium 100 is performed. The pre-scan operation is a preparation operation for deciding a reading width by detecting the width (D2 direction) of the set medium 100, or for deciding, from the amount of reflected light from each RGB light source 3, intensity for each light source at the time of reading. To reduce the operation time, in the pre-scan operation, the leading edge portion of the medium 100 is read with settings of a high conveyance speed (for example, 5 inches/sec) of the medium 100 and a low resolution (for example, 100 dpi) regardless of the actual reading resolution.

Figure 12:
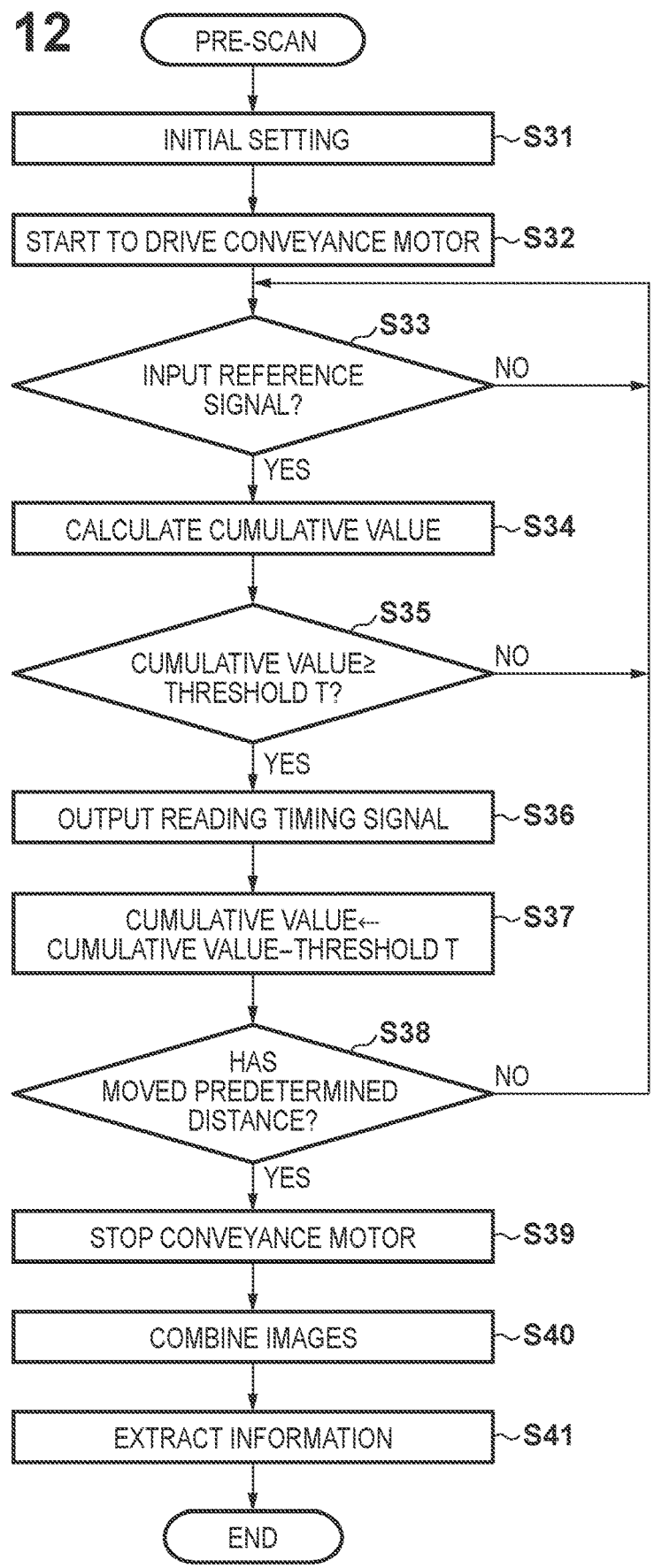
FIG. 12 is a flowchart illustrating an example of processing of the control unit.

FIG. 12 is a flowchart illustrating an example of processing of the pre-scan operation in step S23. In step S31, initial setting is performed. The cumulative value (ΣEmag) of the calculation unit 504 is cleared, and the threshold T=192 is set. With this setting, the reading timing signal is generated at a reading resolution of 100 dpi from the start of the rotation of the conveyance motor 5.

In step S32, the conveyance motor 5 is rotated so that the conveyance speed of the medium 100 is 5 inches/sec. The rotation speed of the conveyance motor 5 can be controlled by feeding back the output of the encoder sensor 22. Along with the rotation of the conveyance motor 5, the reference signal is input from the encoder sensor 22 to the timing control circuit 16.

Steps S33 to S37 indicate the operation of the timing control circuit 16. During driving of the conveyance motor 5, an operation of adding, by the calculation unit 504, the index value Emag for each phase region R every time the reference signal is input (step S33), and outputting the reading timing signal when the cumulative value becomes equal to or larger than the threshold T (=192) is repeated, as described above. Every time the reading timing signal is output, the reading unit 2 reads the image of the medium 100 line by line, and the image is saved in the RAM 18.

In step S38, it is determined whether the moving amount of the medium 100 reaches a predetermined value (for example, 100 mm). If the moving amount reaches the predetermined value, the conveyance motor 5 is stopped in step S39. If the conveyance motor 5 is stopped, the read images are combined, and the combined image is saved in the RAM 18 (step S40).

Next, the CPU 15 extracts information from the combined image in step S41. More specifically, the combined image is read out from the RAM 18, and the leading edge position and width of the medium 100 are specified. The leading edge position and width are obtained by detecting the edge of the combined image and extracting a straight line from the outermost portion of the combined image.

The combined image is separated into R, G, and B images, and a histogram is generated for each image. Then, by comparing the light-receiving intensities of pixels having the highest frequencies among R, G, and B images, white balance at the time of actual reading can be obtained. Based on a comparison result, the LED driver 32 may change a current to flow for each of R, G, and B, and may change a light emission time. Alternatively, by changing the exposure time of the photodiode array 4 for each of R, G, and B, the same result is also obtained. Note that if an image on the platen 11 outside the medium 100 is used as an image region for generating a histogram, white balance is obtained with reference to white of the platen 11. Furthermore, if an image inside the medium 100 is used, white balance can be obtained with reference to the surface color of the medium 100.

If the information (the leading edge position and width of the medium and white balance) extracted in step S41 is not normal, the conveyance motor 5 is reversed to discharge the medium 100, and the user may be prompted to re-scan by the operation panel 30. Alternatively, a predetermined parameter may be set as a white balance value or the like without discharging the medium 100.

Referring back to FIG. 11, if the pre-scan operation in step S23 ends, the process advances to step S24 and the leading edge position of the medium 100 is adjusted. In this example, the conveyance motor 5 is reversed to position the leading edge position of the medium 100 detected by the pre-scan in step S23 at a position before the sensing unit 2A (a position on the upstream side of the sensing unit 2A).

In step S25, selection of a reading mode by the user is accepted via the operation panel 30. A plurality of kinds of reading modes include modes of different reading resolutions. A white balance setting and the like may be different depending on the reading mode. Note that selection of the reading mode is accepted after the pre-scan (step S23) in this embodiment but selection may be accepted before the pre-scan.

Figure 13:
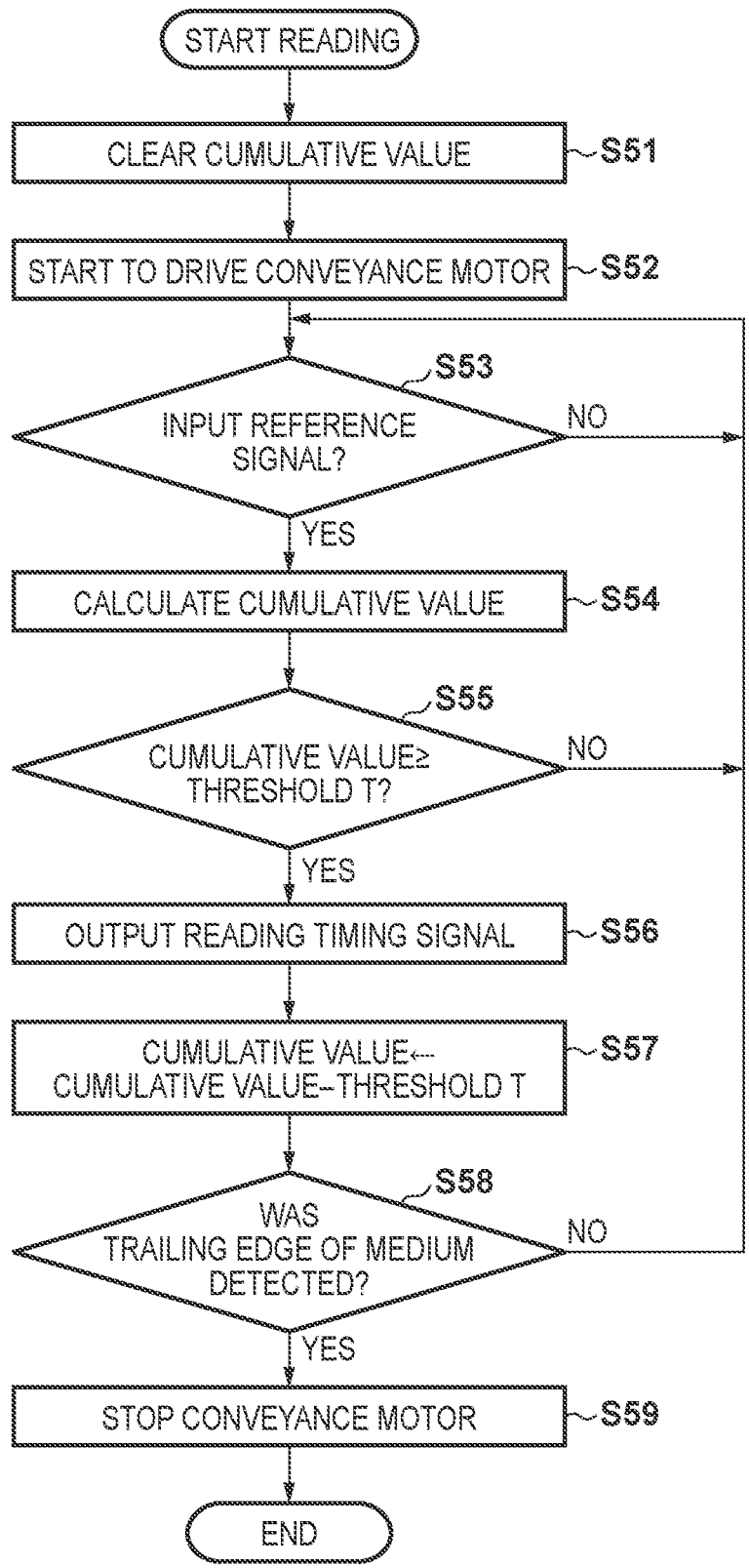
FIG. 13 is a flowchart illustrating an example of processing of the control unit.

In step S26, the threshold T is set in accordance with the selection result of the reading mode in step S25. If the reading mode of a reading resolution of 600 dpi is selected, T=32 is set, and if the reading mode of 300 dpi is selected, T=64 is set. The threshold T is set based on the relationship between the reading resolution and the paper resolution (19,200 dpi in this embodiment) corresponding to the reference signal. Upon completion of the setting of the threshold T, reading of the image of the medium 100 starts in step S27. FIG. 13 is a flowchart illustrating the procedure of the processing.

In step S51, the cumulative value (ΣEmag) of the calculation unit 504 is cleared. In step S52, driving of the conveyance motor 5 starts to convey the medium 100. The driving speed of the conveyance motor 5 may be set in accordance with the selected reading mode. For example, if the reading mode of 600 dpi is selected, the conveyance motor 5 is driven so as to convey the medium 100 at 1 ips.

Steps S53 to S57 indicate the operation of the timing control circuit 16. During driving of the conveyance motor 5, as described above, every time the reference signal is input (step S53), the calculation unit 504 adds the index value Emag for each phase region R (step S54), and when the cumulative value becomes equal to or larger than the threshold T, the reading timing signal is output (steps S56 and S57). Every time the reading timing signal is output, the reading unit 2 reads the image of the medium 100 line by line, and the images of the sensing units 2A to 2C are saved in the RAM 18. This operation is repeated until the trailing edge of the medium 100 is detected.

If, in step S58, the trailing edge detection sensor 13 detects passing of the medium 100, the CPU 15 stops the conveyance motor 5 to stop the reading. If the conveyance motor 5 is stopped, the pulse output from the encoder sensor 22 is stopped, and the input of the reference signal to the timing control circuit 16 ends. This ends the reading processing. Note that the reference signal is input to the timing control circuit 16 in synchronism with driving of the conveyance motor 5 in this embodiment but motor control and reading control may individually be executed. In this case, a gate may be provided inside or outside the timing control circuit 16.

Then, if the reading of the medium 100 ends, the read images of the sensing units 2A to 2C are combined to generate one image, as described above. If the generation processing ends, the user is notified of it via the operation panel and is prompted to issue an image transfer instruction via the I/F 19.

If it is determined in step S28 of FIG. 11 that a predetermined time elapses without setting the next medium 100, the process ends.

In this embodiment, if the reading timing signal is generated, as described above, it is possible to read the image of the medium 100 by correcting the error of the conveyance roller 6. Furthermore, to change the reading resolution, the threshold T is changed and the index value need not be changed. Therefore, the reading resolution can be changed relatively easily. Even if the sensing unit 2A and the sensing units 2B and 2C are separated in the D1 direction, as in this embodiment, it is possible to prevent occurrence of a cyclic image shift in the overlapping portion of the images when combining the read images of the sensing units.

Second Embodiment

Figure 14:
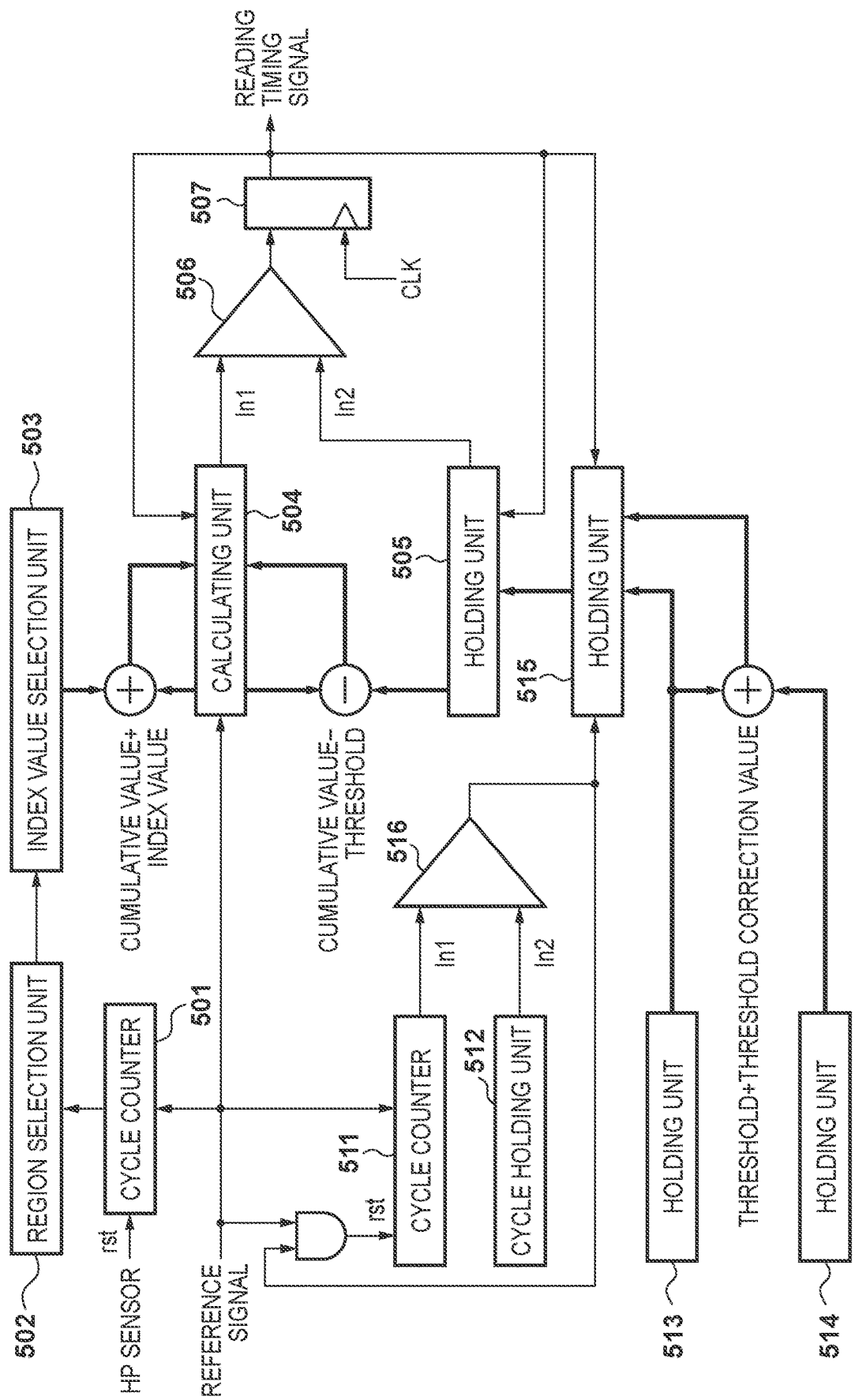
FIG. 14 is a functional block diagram of a timing control circuit.

A threshold T can be corrected at a specific timing. FIG. 14 is a functional block diagram of a timing control circuit 16 according to this embodiment. Components different from those of the timing control circuit 16 of the first embodiment shown in FIG. 9 will be described.

The timing control circuit 16 according to this embodiment can correct, by a correction value held in a holding unit 514, the threshold T corresponding to a reading resolution held in a holding unit 513. Correction of the threshold T is applied substantially periodically to only one generation cycle of a reading timing signal. As components for this, a cycle counter 511, a cycle holding unit 512, a holding unit 515, and a cycle comparison unit 516 are provided.

The cycle counter 511 is a counter that counts up a count value every time a reference signal is input, and the count value is represented by VCount. The cycle holding unit 512 holds a cycle setting value (count threshold) that defines a timing of correcting the threshold T. The cycle comparison unit 516 outputs a signal of L level if the count value of the cycle counter 511 is smaller than the cycle setting value of the cycle holding unit 512, and outputs a signal of H level if the count value of the cycle counter 511 is equal to or larger than the cycle setting value.

If the cycle comparison unit 516 outputs a signal of H level, the holding unit 515 holds a value (corrected threshold T=threshold T+correction value) obtained by adding the correction value held in the holding unit 514 to the threshold T held in the holding unit 513. If the reference signal is input while the cycle comparison unit 516 outputs the signal of H level, a reset signal is input from an AND circuit to the cycle counter 511, and the count value of the cycle counter 511 is cleared. As a result, the cycle comparison unit 516 outputs a signal of L level. The same processing is repeated thereafter.

If a D flip-flop 507 outputs the reading timing signal, the corrected threshold T of the holding unit 515 is set in a threshold holding unit 505, and the corrected threshold T is input to a comparison unit 506. Furthermore, the original threshold T is set in the holding unit 515 from the holding unit 513.

The above operation is repeated every time the reference signal is input. Thus, if the reading timing signal is output after a lapse of the cycle defined by the cycle setting value set in the cycle holding unit 512, the threshold T to be compared with a cumulative value (ΣEmag) in the comparison unit 506 is replaced by the corrected threshold T during one cycle (one section) until the next reading timing signal is output.

Figure 15:
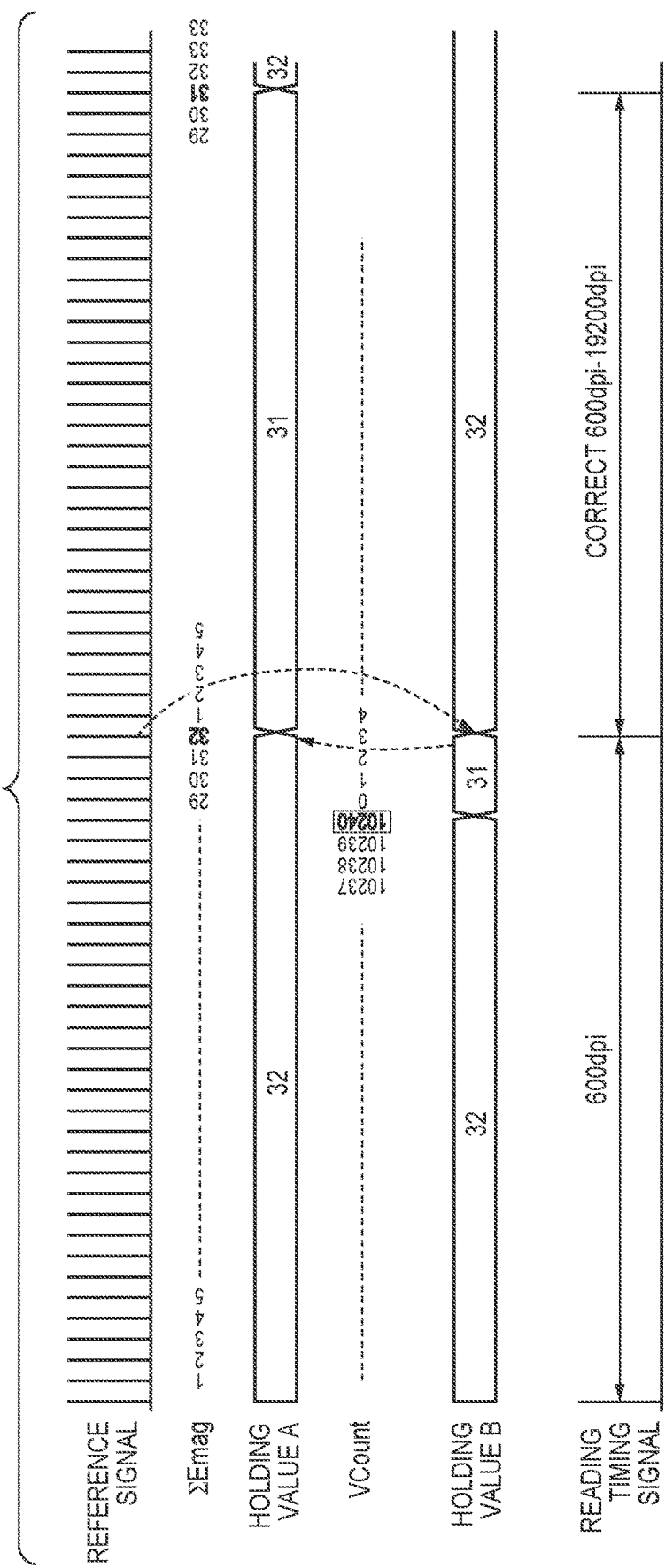
FIG. 15 is a timing chart showing an example of correction of a threshold.

FIG. 15 is a timing chart showing an example in which the threshold T is corrected. In this example, the cycle setting value of the cycle holding unit 512 is 10,240, and the correction value held in the holding unit 514 is set to −1. Therefore, if the reference signal is input 10,240 times, the threshold T is decremented by one until the next reading timing signal is output. The threshold held in the holding unit 505 is represented as holding value A and the threshold held in the holding unit 515 is represented as holding value B.

The value VCount reaches the cycle setting value and holding value B is set to the corrected threshold=31 (=32−1). In a state in which the threshold T held as holding value A is 32, the cumulative value (ΣEmag) is 32 or more, and the reading timing signal is output. Thus, holding value A is updated by holding value B, and the threshold T=31 is set until the next reading timing signal is output. Holding value B returns to 32 as the original value.

With this operation, it is possible to apply vertical magnification correction of a read image while maintaining error correction of a conveyance roller 6 described in the first embodiment. In the vertical magnification correction, it is possible to correct an image length error (vertical magnification error) generated by sliding of the conveyance roller 6 caused by the type of a medium 100 and a conveyance speed. For example, according to an experiment by the present inventors, it is confirmed that even if a plain paper and a thick glossy paper with identical images are conveyed at the same conveyance speed, a read image of the thick glossy paper is shorter by 0.01%. Furthermore, it is confirmed that there is a difference of about 0.2% in the conveyance amount between a case where a plain paper is conveyed at 7.5 ips and a case where a plain paper is conveyed at 0.6 ips. Even for the same type of media, an error may occur in the conveyance amount in accordance with a use environment such as the temperature and humidity. Such error can be specified from an experiment result, and vertical magnification correction can be implemented by setting the correction cycle and the correction value of the threshold T in accordance with the specified contents.

Figure 16:
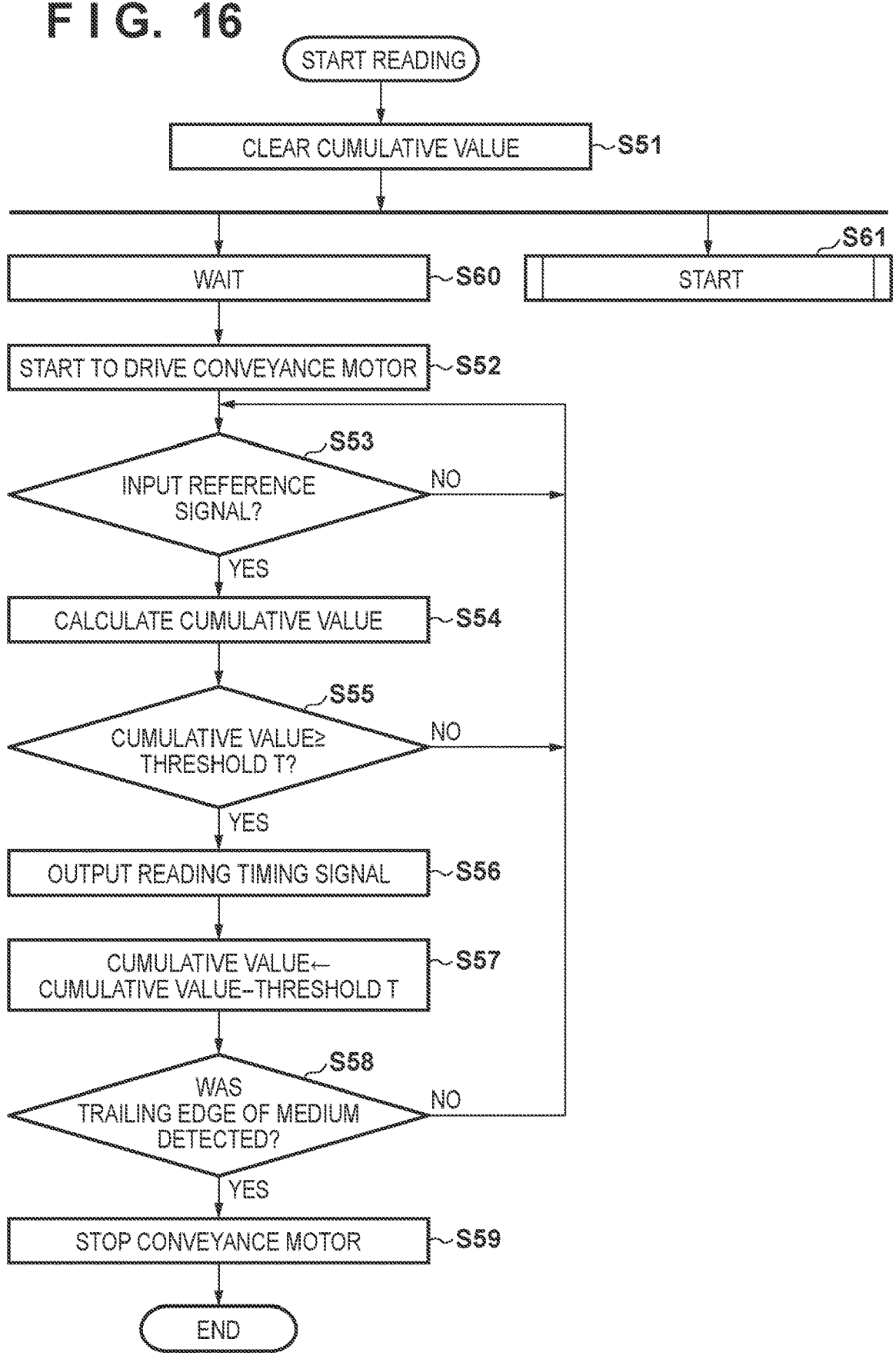
FIG. 16 is a flowchart illustrating an example of processing of a control unit.

Reading start control according to this embodiment will be described with reference to FIG. 16. Processes different from those in reading start control of the first embodiment shown in FIG. 13 will be described.

If the processing starts, the cumulative value (ΣEmag) of a calculation unit 504 is cleared in step S51. After that, in step S61, a vertical magnification correction operation starts. Simultaneously with this, in step S60, the process stands by for a lapse of a wait time for waiting for completion of a setting operation (steps S70 and S74 to be described later) of the vertical magnification correction operation. After that, the same processing as in the example shown in FIG. 13 is executed from step S52.

Figure 17:
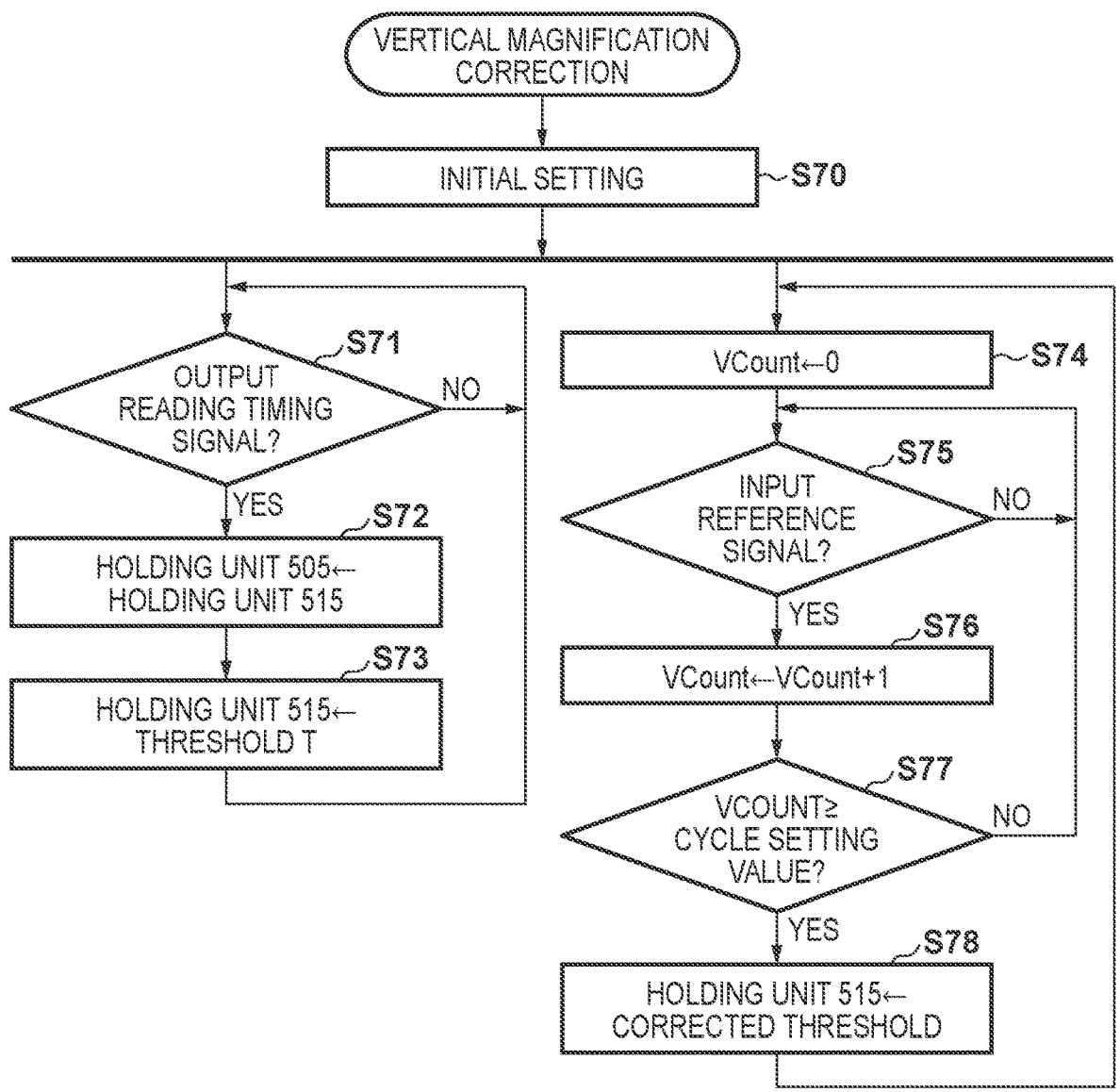
FIG. 17 is a flowchart illustrating an example of processing of the control unit.

FIG. 17 is a flowchart illustrating an example of the processing of the vertical magnification correction operation in step S61. In step S70, initial setting is performed. In this example, the cycle setting value is set in the cycle holding unit 512, and the correction value is set in the holding unit 514. These values may be determined in advance in accordance with the type of the medium 100 by prompting the user to select the type of the medium 100 at the time of selecting a reading mode, or may be saved in a ROM 17 and then read out.

As examples of the values, for example, assume that if index value setting processing is performed, the vertical magnification ratio of the thick glossy paper with respect to the plain paper is −0.01%. If the thick glossy paper is selected as the medium 100, 10,000 is set as the cycle setting value in the cycle holding unit 512, and −1 is set as the correction value in the holding unit 514. Thus, while the reading timing signal is output once about every 10,000 times of the input operation of the reference signal, the threshold T is decremented by one. For example, in the case of a reading mode of 600 dpi, the timing control circuit 16 normally operates with the threshold T=32 but the threshold is set to 31 during only one section of the reading timing signal every 10,000 times of the input operation of the reference signal. As a result, the number of times of reading of the medium 100 increases, and the length in the D1 direction of the finally formed image is longer.

In step S74, VCount is cleared to 0. If the reference signal is input in step S75, the cycle counter 511 increments VCount by one in step S76. In step S77, it is determined whether VCount reaches the cycle setting value of the cycle holding unit 512. If VCount reaches the cycle setting value, the process advances to step S78; otherwise, the process returns to step S75. In step S78, the corrected threshold T is held in the holding unit 515.

If it is determined in step S71 that the reading timing signal is output, the value held in the holding unit 515 is held, in step S72, in the holding unit 505 and used as the threshold T. In step S73, the holding unit 515 holds the threshold T held in the holding unit 513. The above operation is repeated.

In this embodiment, in addition to the effect of the first embodiment, vertical magnification correction can be performed. Therefore, it is possible to readily correct an error generated by a difference of the medium 100 or a difference in conveyance speed.

Third Embodiment

Figure 18:
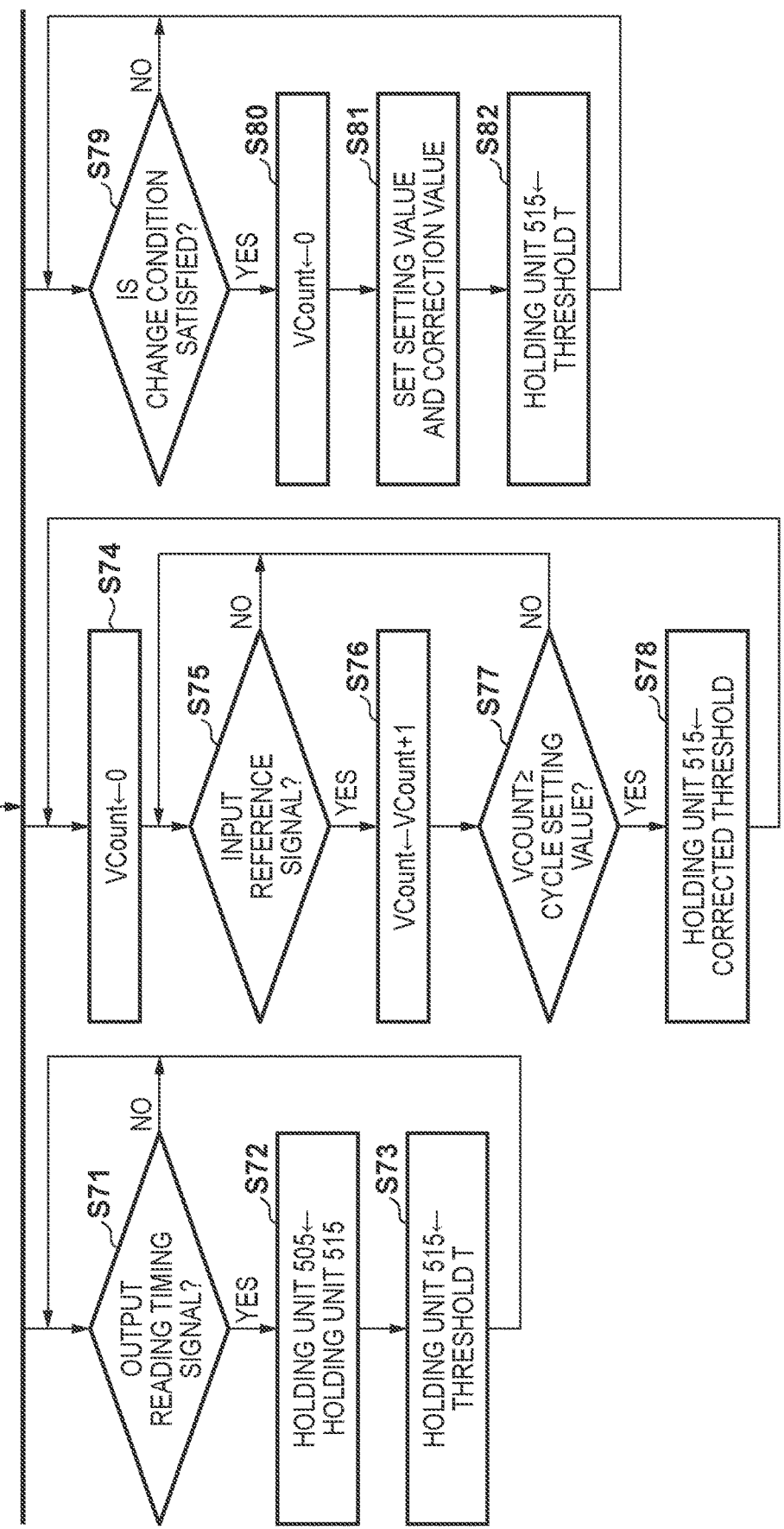
FIG. 18 is a flowchart illustrating an example of processing of a control unit.

If vertical magnification correction is performed as in the second embodiment, at least one of a cycle setting value of a cycle holding unit 512 and a correction value of a threshold T may be changed during vertical magnification correction. FIG. 18 is a flowchart illustrating an example. Processes different from the example of FIG. 17 will be described. In this embodiment, processes in steps S79 to S82 are executed. In step S79, it is determined whether a change condition of the correction value is satisfied. If the change condition is satisfied, the process advances to step S80. In step S80, VCount is cleared to 0. In step S81, a new cycle setting value is set in the cycle holding unit 512, and a new correction value is set in a holding unit 514. In step S82, the threshold T held in a holding unit 513 is held in a holding unit 515. Then, the new cycle setting value and correction value set in step S81 are used in a subsequent operation.

An example of the change condition in step S79 is, for example, a change of the conveyance state of a medium 100. In a reading apparatus 1 of this embodiment, a state in which the medium 100 is conveyed only by a conveyance roller 6 on the upstream side is changed to a state in which the medium 100 enters a conveyance roller 7 on the downstream side and is conveyed by the conveyance rollers 6 and 7. At the timing at which the medium 100 enters the conveyance roller 7, the change condition may be satisfied. If the distance between a trailing edge detection sensor 13 and the conveyance roller 7 on the downstream side is known in advance, the change condition may be satisfied when a reference signal is input a predetermined number of times after the trailing edge detection sensor 13 detects the medium 100.

Fourth Embodiment

In an arrangement in which sensing units 2A to 2C are shifted in the D1 direction and arranged, if a threshold T can be changed by a correction value as in the third embodiment, this may influence read images. The relationship between the read images and a timing of switching a conveyance state will be described with reference to FIGS. 19A and 19B.

Figure 19A:
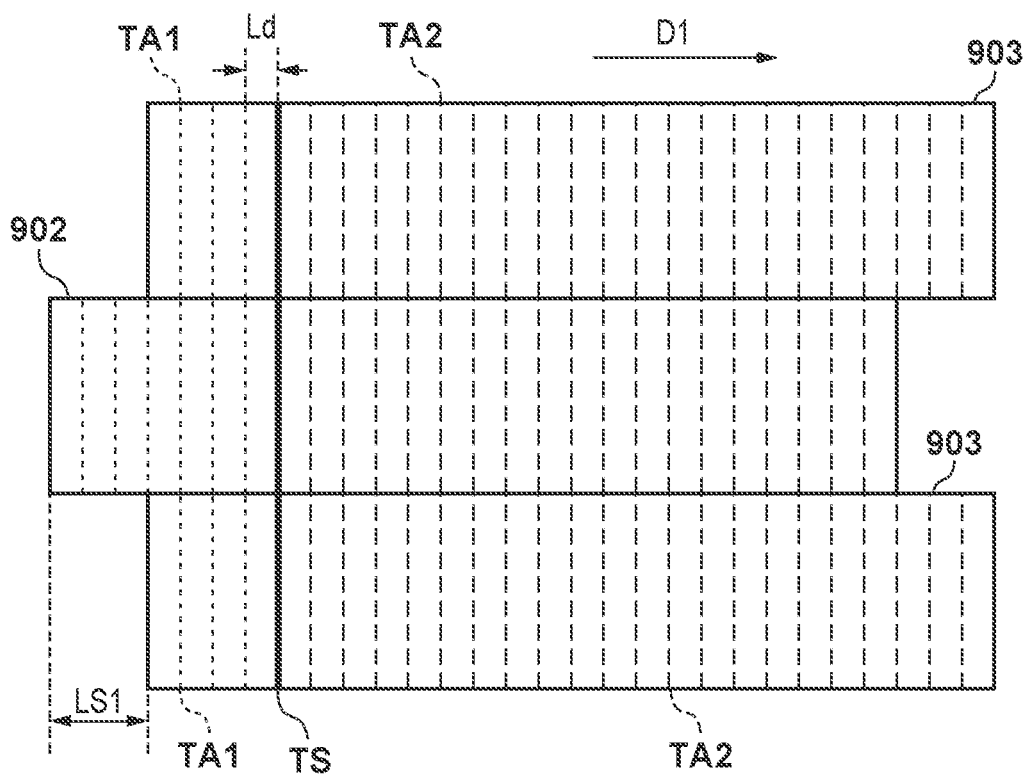
FIGS. 19A and 19B are explanatory views of the change of the cycle of threshold correction.

FIG. 19A is a view showing an image 902 read by the sensing unit 2A and images 903 read by the sensing units 2B and 2C along a lapse of time. In a reading apparatus 1, the sensing unit 2A and the sensing units 2B and 2C are arranged at a distance in the D1 direction in a so-called staggered pattern. First, the sensing unit 2A starts to read a medium 100 conveyed by a conveyance roller 6. After that, conveyance of the medium 100 advances, and if the leading edge portion of the medium 100 reaches the sensing units 2B and 2C, the sensing units 2B and 2C start to read the medium 100. Conveyance of the medium 100 further advances, and at a timing when the leading edge of the medium 100 enters a conveyance roller 7, the conveyance state of the medium 100 changes so that the medium 100 is conveyed by the conveyance rollers 6 and 7. Therefore, the image 902 read by the sensing unit 2A is different in the conveyance state before and after the timing at which the leading edge of the medium 100 enters the conveyance roller 7 after passing through the sensing unit 2A.

On the other hand, the images 903 read by the sensing units 2B and 2C are different in the conveyance state of the medium 100 before and after the timing at which the leading edge of the medium 100 enters the conveyance roller 7 after passing through the sensing units 2B and 2C. Therefore, regions of the images read by the sensing units 2B and 2C until a switching timing TS of the conveyance state are shorter than that of the image read by the sensing unit 2A by a distance LS1 in the D1 direction between the sensing unit 2A and the sensing units 2B and 2C.

Assume that vertical magnification correction is performed in the reading operation during a period until the switching timing TS of the conveyance state. The length of the image applied with vertical magnification correction is different between the sensing unit 2A and the sensing units 2B and 2C. Therefore, the number of timings TA1 of vertical magnification correction performed in this conveyance state is different between the image 902 read by the sensing unit 2A and the images 903 read by the sensing units 2B and 2C.

If parameters such as the cycle setting value of vertical magnification correction are changed at the timing TS to continue the vertical magnification correction operation, the image that is applied with vertical magnification correction at an interval of a timing TA2 of vertical magnification correction performed in a different conveyance state is read.

Figure 19B:
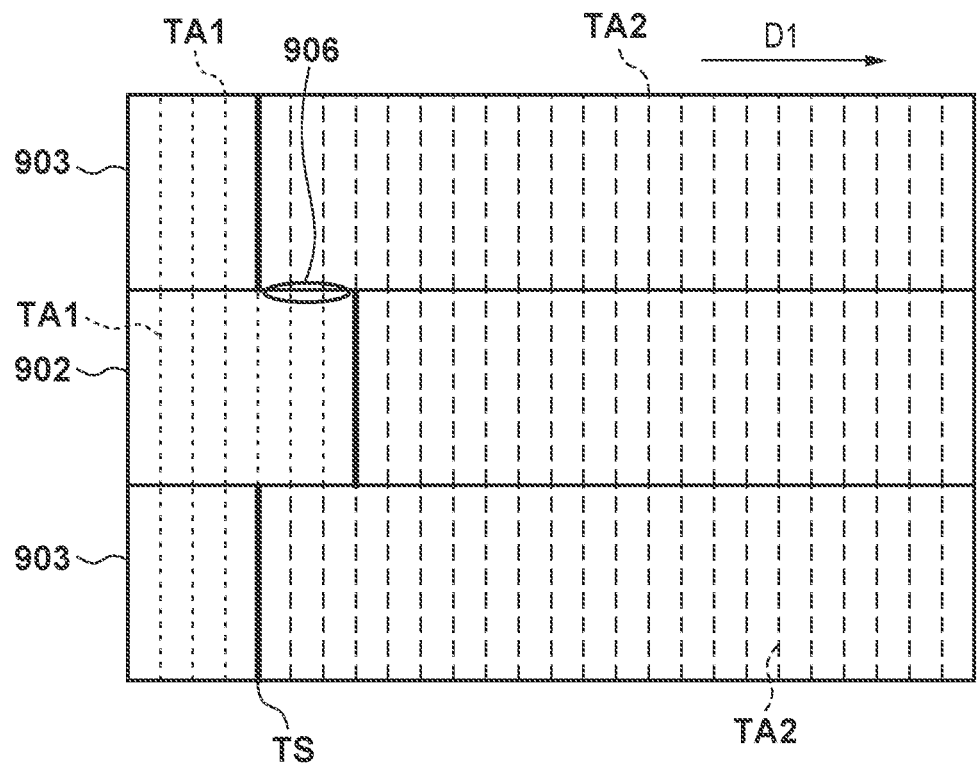

As described above, the images read by the sensing units 2A to 2C are combined to generate one image by offsetting data for the number of lines corresponding to the distance LS1 in the conveyance direction between the sensing unit 2A and the sensing units 2B and 2C. FIG. 19B shows the combined image. Therefore, if the parameters of vertical magnification correction are changed in accordance with the change of the conveyance state, the images influenced by the different vertical magnification correction operations are combined so as to overlap each other in joint portions 906 of regions having a length corresponding to the distance LS1.

If, in the regions where the images influenced by the different vertical magnification correction operations overlap each other, the condition that timings of performing the vertical magnification correction operations match each other in the D1 direction is satisfied, the combined image may deteriorate in the joint portions 906.

For example, if the vertical magnification correction operation with a vertical magnification ratio of −0.01% is performed until the switching timing TS of the conveyance state, the vertical magnification correction timing TA1 periodically occurs once every 10,000 times of the input operation of the reference signal, as described above. After that, even if the vertical magnification correction operation is performed by changing the vertical magnification ratio to +0.01% in accordance with the change of the conveyance state, the vertical magnification correction timing TA2 periodically occurs once every 10,000 times of the input operation of the reference signal. The respective correction value in this case is set to a value with an opposite positive/negative sign.

At this time, if the vertical magnification correction operation with a vertical magnification ratio of −0.01% is performed, the threshold of the timing signal is changed, during only one section, from 32 to 31 at the vertical magnification correction timing TA1 that occurs every 10,000 times of the input operation of the reference signal. Therefore, a timing of generating the reading timing signal is changed so that the interval of the timing signal is narrower only in this section than that in the preceding and succeeding sections. That is, at the vertical magnification correction timing TA1, a reading operation is performed within a time shorter than normal.

To the contrary, if the vertical magnification correction operation with a vertical magnification ratio of +0.01% is performed, the threshold of the timing signal is changed, during only one section, from 32 to 33 at the vertical magnification correction timing TA2 that occurs every 10,000 times of the input operation of the reference signal. Therefore, the timing of generating the reading timing signal is changed so that the interval is wider only in this section than that in the preceding and succeeding sections. That is, at the vertical magnification correction timing TA2, a reading operation is performed within a time longer than normal. This increases/decreases the light emission times of LED light sources 3 or the exposure times of photodiode arrays 4 of the sensing unit 2A and the sensing units 2B and 2C, thereby influencing the densities of the read images.

In the reading operation shown in FIG. 18, if the parameters of the vertical magnification correction operation are changed in accordance with the change of the conveyance state, VCount is cleared (step S80). Therefore, the cycle of the vertical magnification correction operation collapses at the switching timing TS of the conveyance state. More specifically, as shown in FIG. 19A, the cycle shifts by an interval Ld between the switching timing TS of the conveyance state and a correction timing immediately before the switching timing TS of the conveyance state among the vertical magnification correction timings TA1.

Assume a case where the distance LS1 corresponding to the number of lines by which the read image is offset is arranged at such interval that the shift of the cycle caused by the interval Ld is canceled. In this case, in the joint portions of the regions 906, the timing TA1 of the vertical magnification correction operation with a vertical magnification ratio of −0.01% matches the timing TA2 of the vertical magnification correction operation with a vertical magnification ratio of +0.01% in the D1 direction. A condition for establishing such case is that, for example, the remainder obtained by dividing the distance LS1 by a smaller value of the cycle of the timing TA1 and the cycle of the timing TA2 is equal to or approximates the interval Ld.

If the condition is satisfied, a line at which the reading interval of the sensing units 2B and 2C is shorter and a line at which the reading interval of the sensing unit 2A is longer are aligned and combined, and thus the influence of a difference in thickness between the lines or a density difference is easily noticeable in the joint portions.

Figure 20:
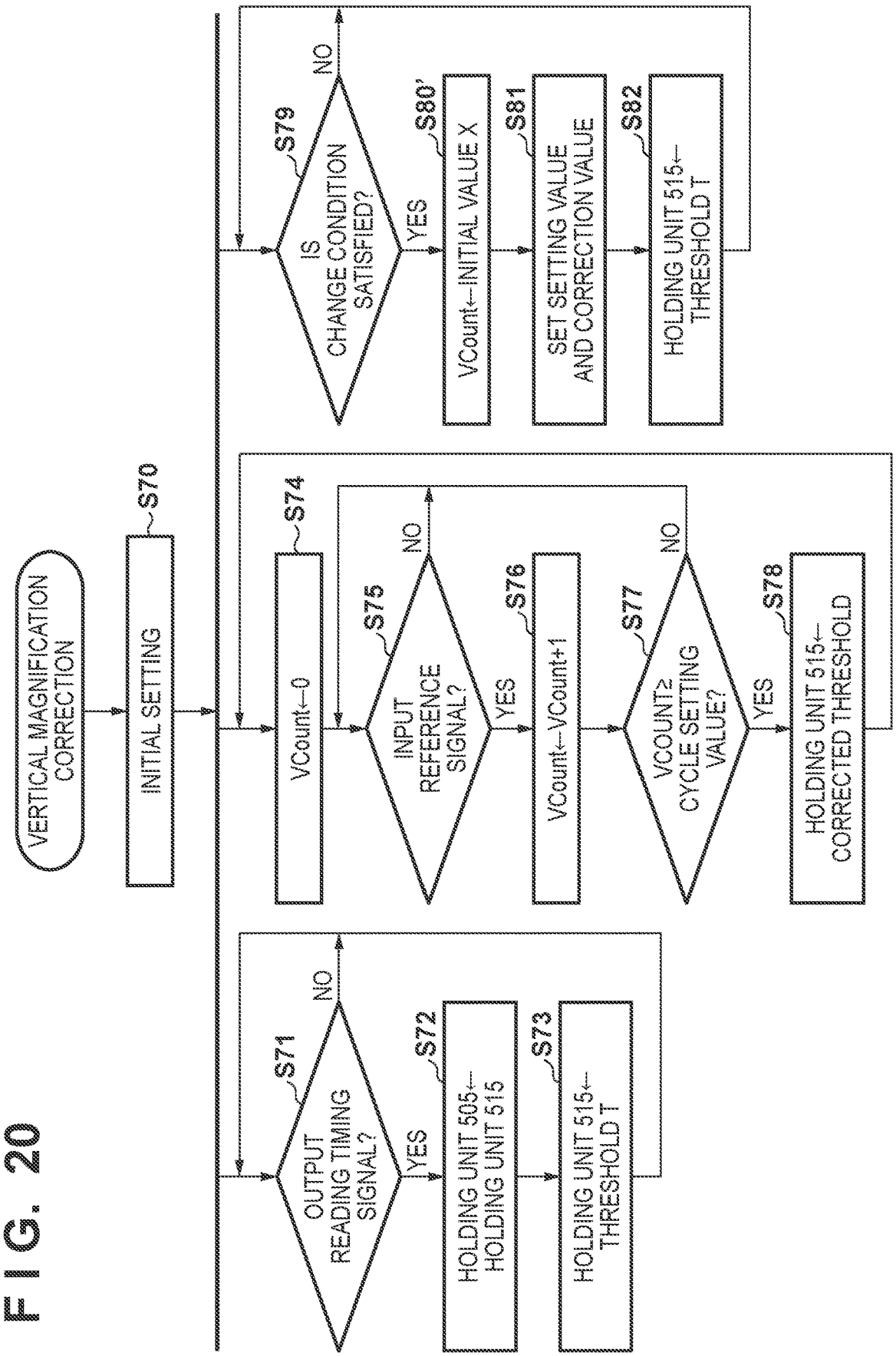
FIG. 20 is a flowchart illustrating an example of processing of a control unit.

As measures against this, processing shown in FIG. 20 can be adopted instead of the processing shown in FIG. 18. Processes different from those in FIG. 18 will be described. In the processing shown in FIG. 20, processing in step S80' is executed instead of step S80 of FIG. 18. In step S80', an initial value X is set in VCount. At this time, the initial value X may be a negative value. Thus, if the conveyance state of the medium 100 is changed, VCount is counted from the initial value, and thus the vertical magnification correction operation is executed at a timing of "cycle setting value— initial value X".

Figure 21A:
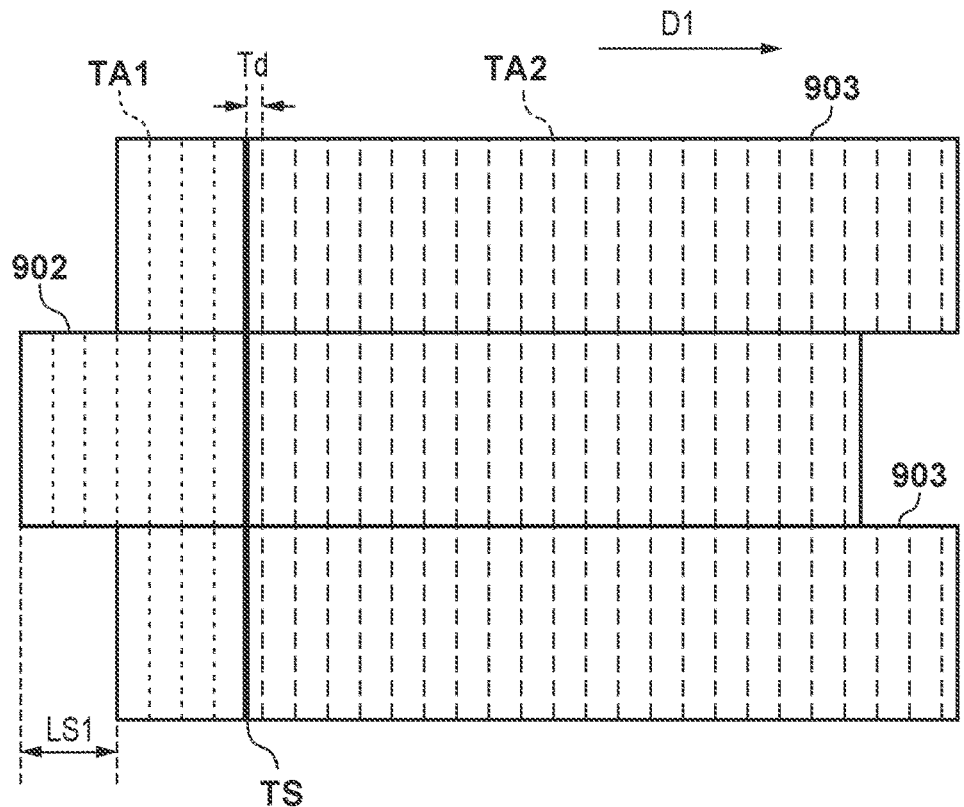
FIGS. 21A and 21B are explanatory views of the change of the cycle of threshold correction.
Figure 21B:
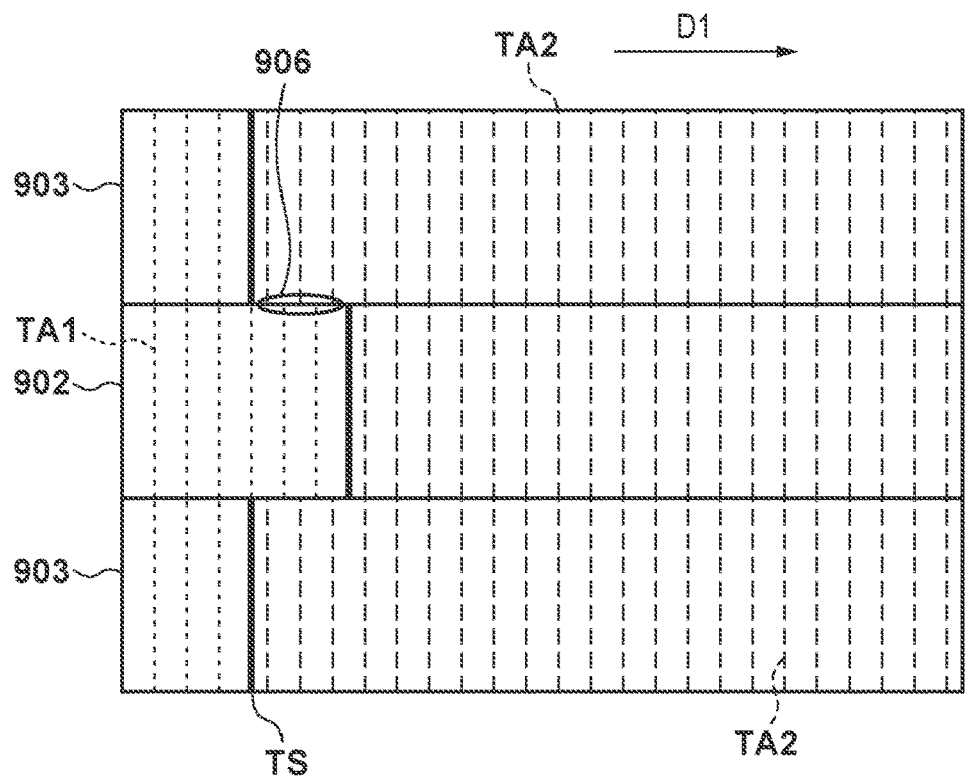

For example, as shown in FIG. 21A, the initial value X is set to such value that the start timing of the vertical magnification correction operation after the switching timing TS of the conveyance state is set at an interval Td. Thus, as shown in FIG. 21B, when combining the images read by the sensing units 2A to 2C, the timings of the vertical magnification correction operations of different correction directions can be prevented from matching each other in the joint portions of the regions 906. If, as the value of the interval Td, a value half of a smaller value of the cycles of the vertical magnification correction timings TA1 and TA2 is set, the correction timings can be shifted from each other at the maximum.

Figure 22A:
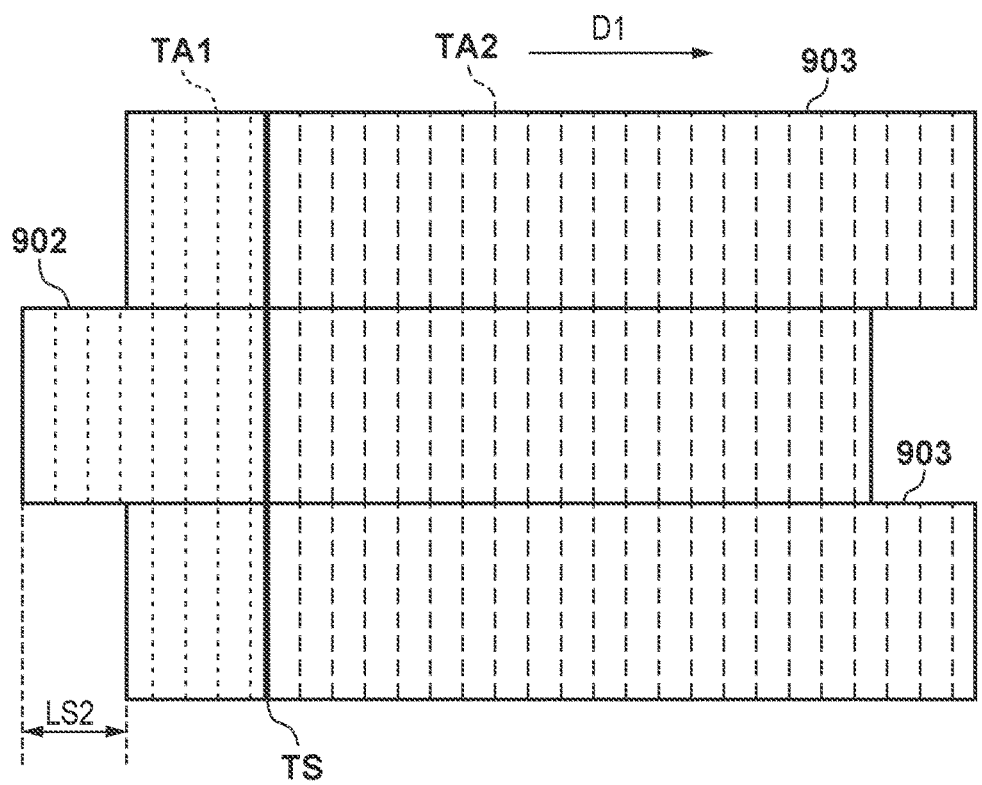
FIGS. 22A and 22B are explanatory views of the change of the cycle of threshold correction.

FIG. 22A is a view showing the image 902 read by the sensing unit 2A and the images 903 read by the sensing units 2B and 2C along a lapse of time, similar to FIG. 19A. However, an interval LS2 between the sensing unit 2A and the sensing units 2B and 2C satisfies a relationship of LS2>LS1.

Figure 22B:
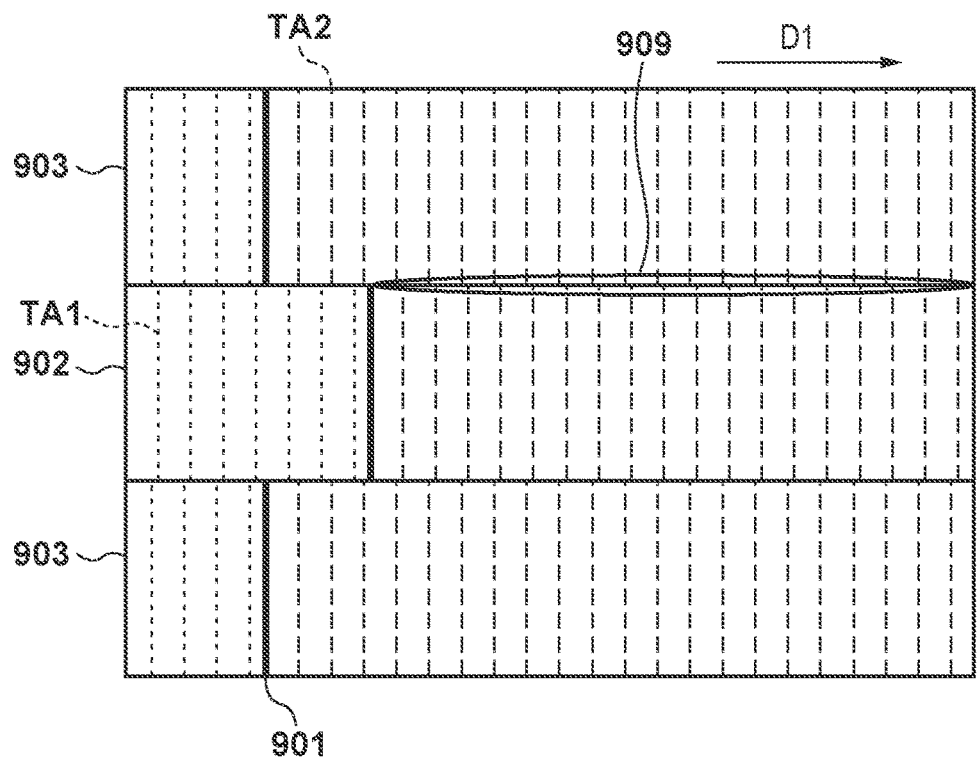

In this case as well, to form a final read image, data is offset by the interval LS2 between the sensing unit 2A and the sensing units 2B and 2C. However, as shown in FIG. 22B, the vertical magnification correction timings TA2 of the sensing unit 2A and the sensing units 2B and 2C do not match each other in the D2 direction in joint portions of regions 909. The same applies to the timings TA1.

This situation occurs when the interval LS2 between the sensing unit 2A and the sensing units 2B and 2C is not a multiple of the cycle of the vertical magnification correction timing TA1. In other words, as the interval LS2 between the sensing unit 2A and the sensing units 2B and 2C is closer to a multiple of the cycle of the vertical magnification correction timing TA1, the timings of vertical magnification correction operations of the same correction direction readily match each other in the D1 direction. Note that the timings of vertical magnification correction operations of different correction directions are independent of this condition, and do not match each other in this example.

Next, to prevent the timings TA1 and TA2 from matching each other, a plurality of timing control circuits 16 may be provided. In this case, one timing control circuit 16 may be assigned to the sensing unit 2A and one timing control circuit 16 may be assigned to the sensing units 2B and 2C (in total, two timing control circuits 16). If it is possible to individually control the sensing unit 2A and the sensing units 2B and 2C, it is possible to shift the start timing of the vertical magnification correction operation after the switching timing TS of the conveyance state only in the sensing unit 2A.

Figure 23A:
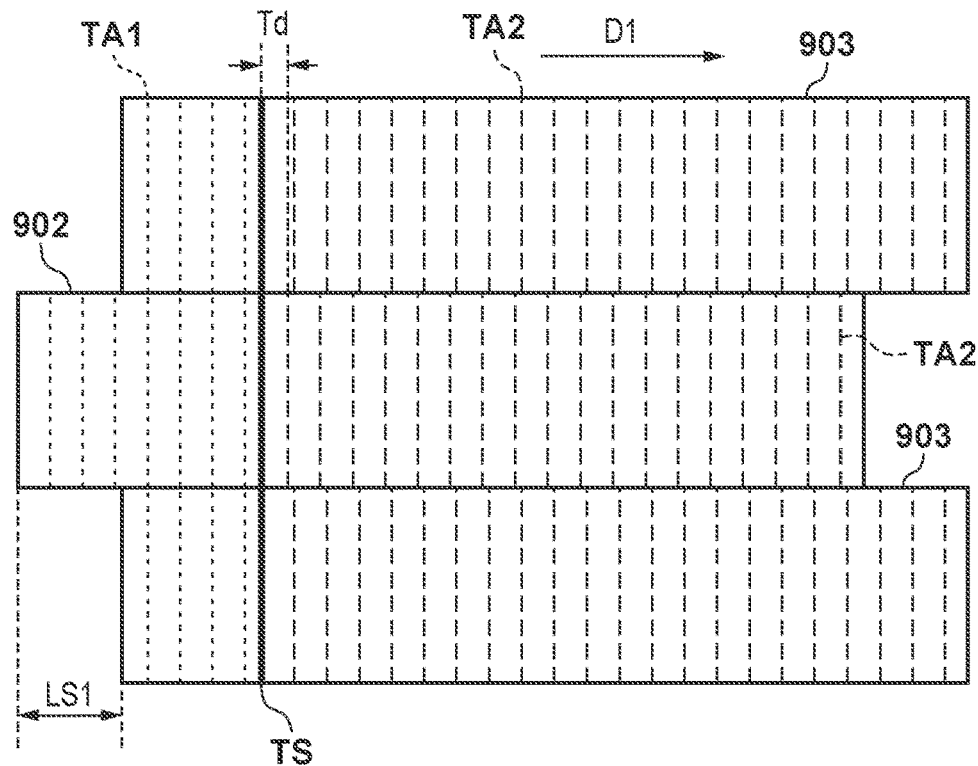
FIGS. 23A and 23B are explanatory views of the change of the cycle of threshold correction.
Figure 23B:
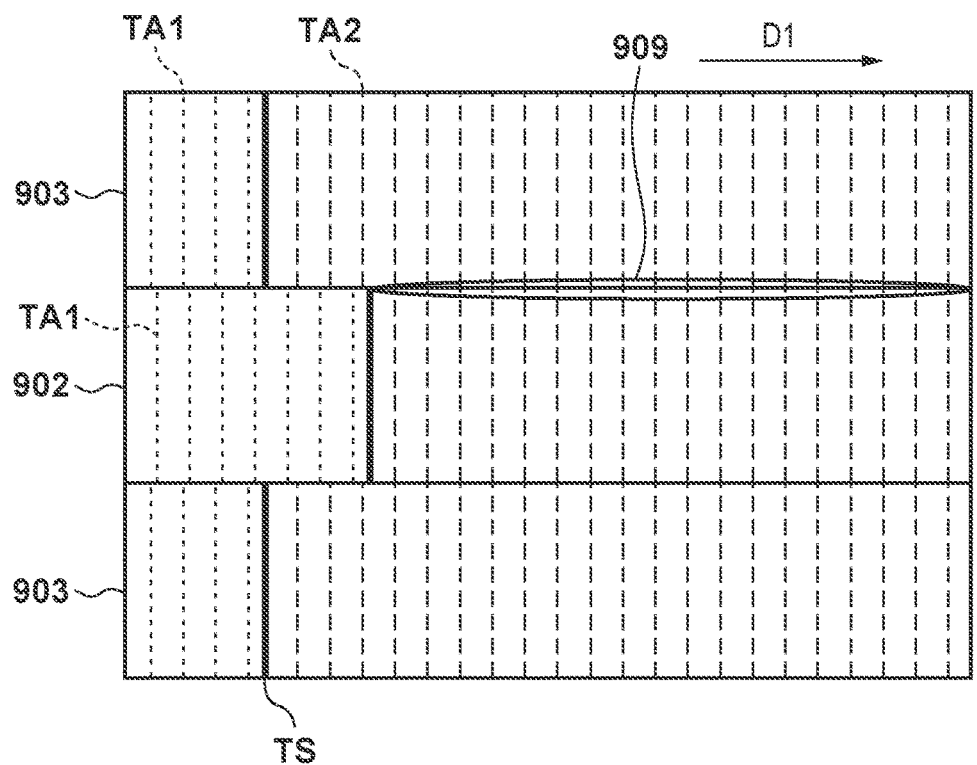

In this case, as shown in FIG. 23A, the timing control circuit 16 of the sensing unit 2A sets the initial value X so that the start timing of the vertical magnification correction timing TA2 is set at the interval Td. Thus, as shown in FIG. 23B, when combining the read images, the vertical magnification correction timings TA2 match each other in the D1 direction in the joint portions of the regions 909.

The value of the interval Td is obtained by subtracting, from the cycle of the vertical magnification correction timing TA2, the remainder obtained by dividing the interval LS by the cycle of the vertical magnification correction timing TA2. Thus, even after the images read by the sensing units are combined to generate one image, the vertical magnification correction timings TA2 match each other in the D1 direction, thereby making it possible to minimize the influence of vertical magnification correction on the read images.

Note that in this example, the vertical magnification correction timing TA2 of the sensing unit 2A is shifted. However, even if the vertical magnification correction timing TA2 of the sensing units 2B and 2C is shifted, it is possible to obtain the same effect.

Figure 24:
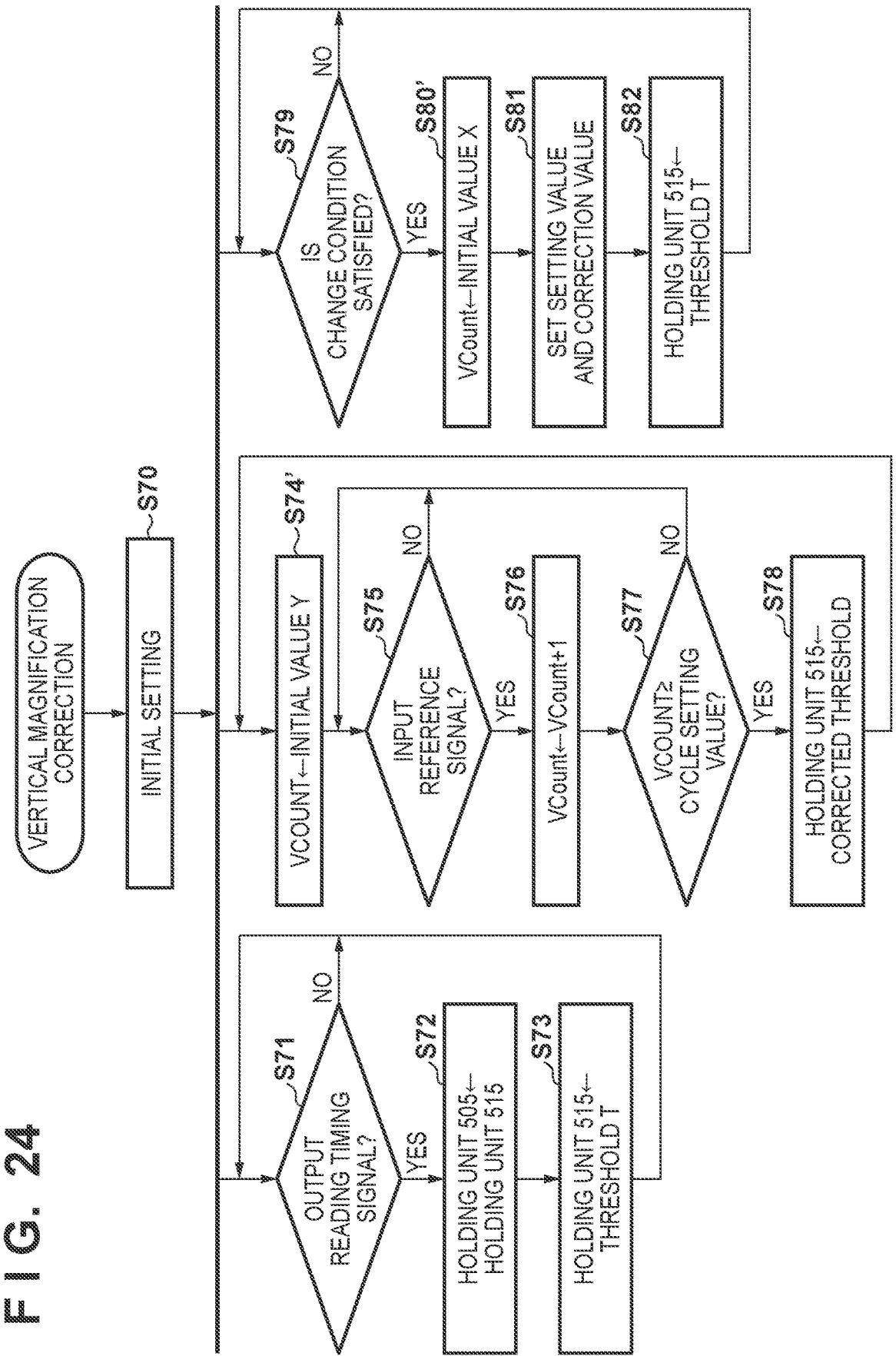
FIG. 24 is a flowchart illustrating an example of processing of the control unit.

Furthermore, in the example shown in FIG. 20, the start timing of the vertical magnification correction operation is shifted by setting the initial value X in VCount in step S80', but an example of processing shown in FIG. 24 can also be adopted. In the example of the processing shown in FIG. 24, an initial value Y is set in VCount in step S74' instead of step S74. Before the conveyance state is switched, that is, at a timing of starting reading of the medium 100, the timing control circuit 16 of the sensing unit 2A shifts the start timing of the vertical magnification correction operation. Therefore, when combining read images to generate one image, the vertical magnification correction timings TA1 can be made to match each other in the D1 direction. Note that the timing control circuit 16 of the sensing units 2B and 2C may adopt the processing of step S74'. The initial value Y may be set based on the relationship with the initial value X. Furthermore, in the example shown in FIG. 24, VCount may be reset without setting the initial value X in step S80'.

Fifth Embodiment

Figure 25:
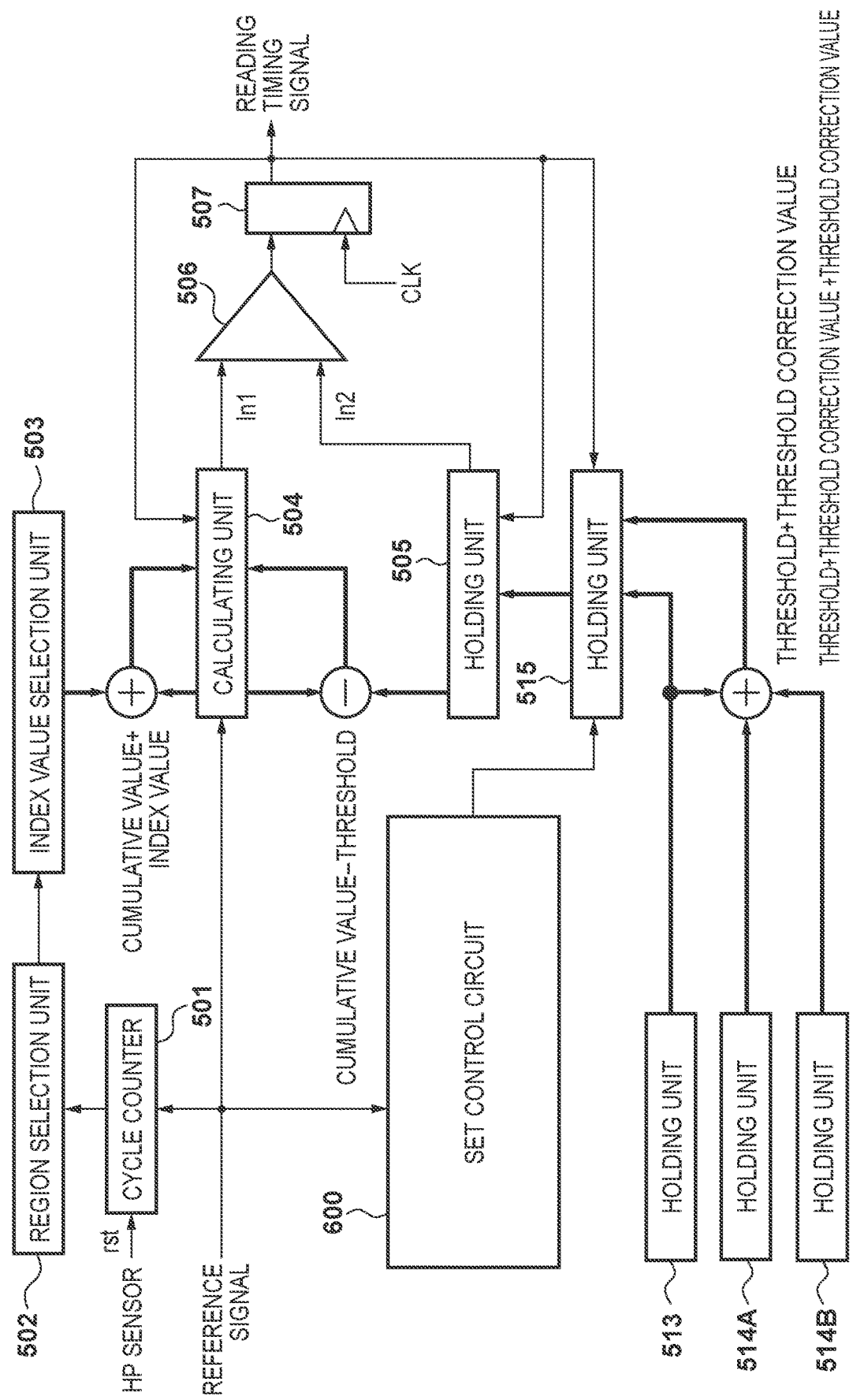
FIG. 25 is a functional block diagram of a timing control circuit.

If vertical magnification correction is performed as in the second to fourth embodiments, a plurality of correction values of a threshold T may be prepared and applied. A cycle at which the correction value is applied may be set for each correction value. FIG. 25 is a functional block diagram of a timing control circuit 16 according to this embodiment. Components different from those in the timing control circuit 16 of the second embodiment shown in FIG. 14 will be described.

The timing control circuit 16 according to this embodiment includes two holding units 514A and 514B as components corresponding to the holding unit 514 shown in FIG. 14. Each of the holding units 514A and 514B holds a correction value for correcting the threshold T held in a holding unit 513 and corresponding to a reading resolution. The correction value held in the holding unit 514A is represented as correction value A and the correction value held in the holding unit 514B is represented as correction value B.

Figure 26:
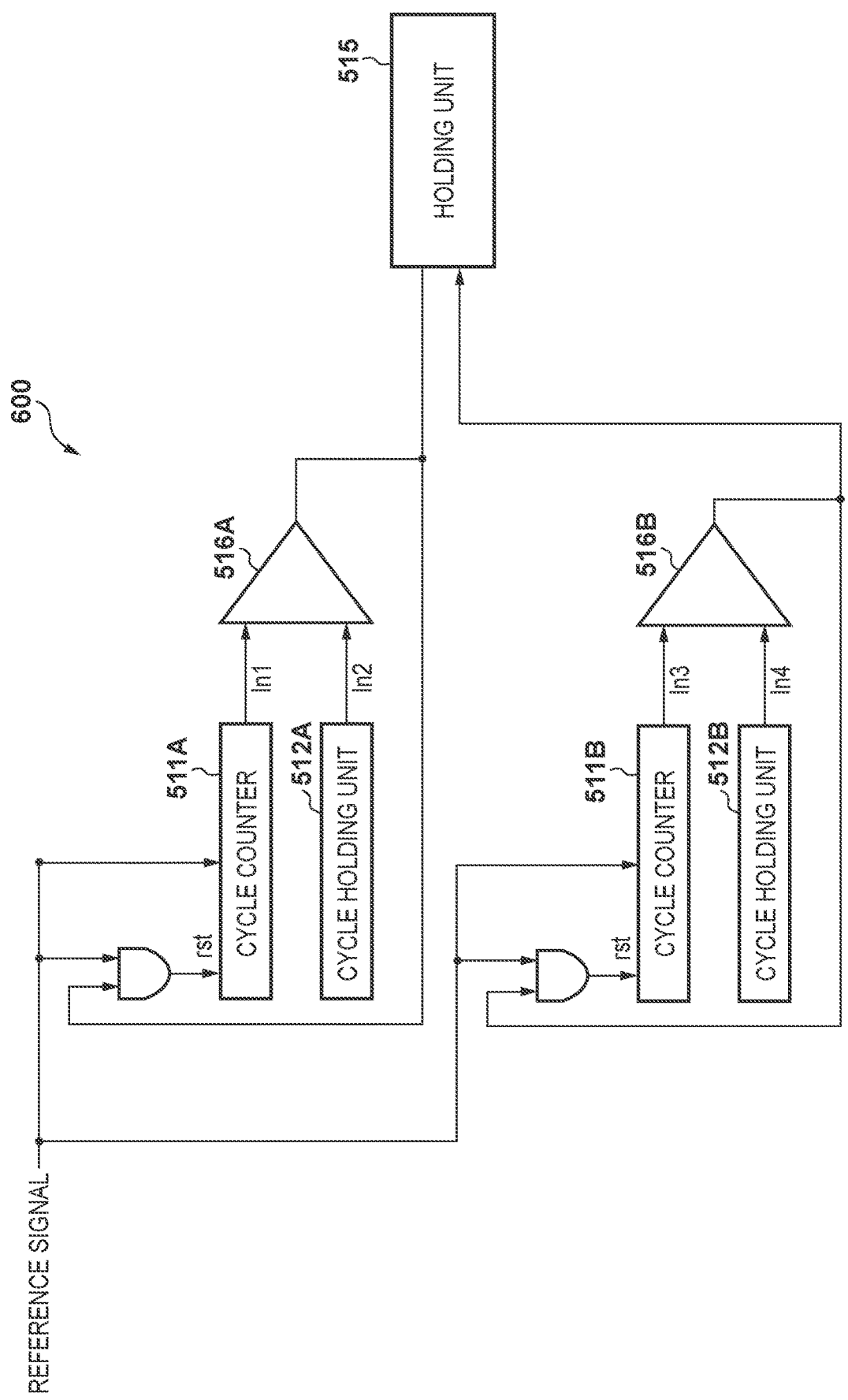
FIG. 26 is a functional block diagram of a set control circuit.

A set control circuit 600 is a circuit that controls the correction timing of the threshold T. FIG. 26 is a functional block diagram of the set control circuit 600. The set control circuit 600 includes two sets of components corresponding to the cycle counter 511, the cycle holding unit 512, and the cycle comparison unit 516 of FIG. 14. A cycle counter 511A, a cycle holding unit 512A, and a cycle comparison unit 516A control the application timing of the correction value A of the holding unit 514A. A cycle counter 511B, a cycle holding unit 512B, and a cycle comparison unit 516B control the application timing of correction value B of the holding unit 514B. Each of the two sets of the components functions similar to the cycle counter 511, the cycle holding unit 512, and the cycle comparison unit 516 of FIG. 14. The count value of the cycle counter 511A is represented by VCount A, and the count value of the cycle counter 511B is represented by VCount B.

Figure 27:
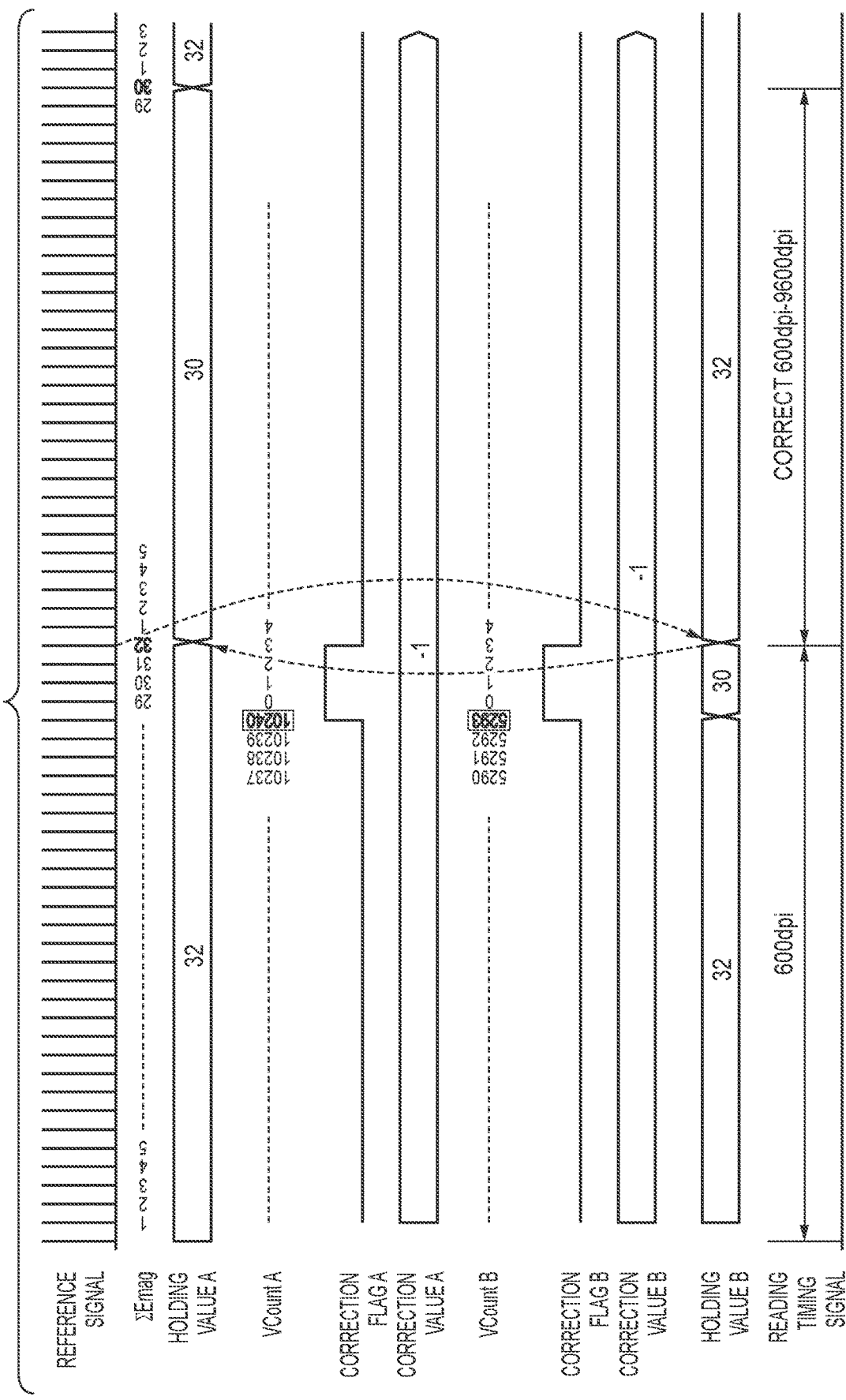
FIG. 27 is a timing chart showing an example of correction of a threshold.

FIG. 27 is a timing chart showing an example in which the threshold T is corrected. In the example, the cycle setting value of the cycle holding unit 512A is 10,240, and the cycle setting value of the cycle holding unit 512B is 5,293. Correction values A and B are both −1. A signal output from the cycle comparison unit 516A is represented as correction flag A (correction notification A), and a signal output from the cycle comparison unit 516B is represented as correction flag B (correction notification B).

In the example shown in FIG. 27, if correction flags A and B are simultaneously set to H level, correction values A and B are simultaneously applied to the threshold T and set in a holding unit 515. Then, if the next reading timing signal is output, holding value A of the holding unit 505 is set to 30, and the threshold T is corrected from 32 to 30.

As described above, in this embodiment, the plurality of correction values A and B can be applied. In the example shown in FIG. 27, correction values A and B are simultaneously applied but the cycle setting values of the cycle holding units 512A and 512B are different from each other, and thus one of correction values A and B can be applied depending on the timing.

In the example shown in FIG. 27, as a result of simultaneously applying the plurality of correction values A and B, the total correction amount of the threshold T is −2. The threshold T may abruptly change to influence an image.

Figure 28:
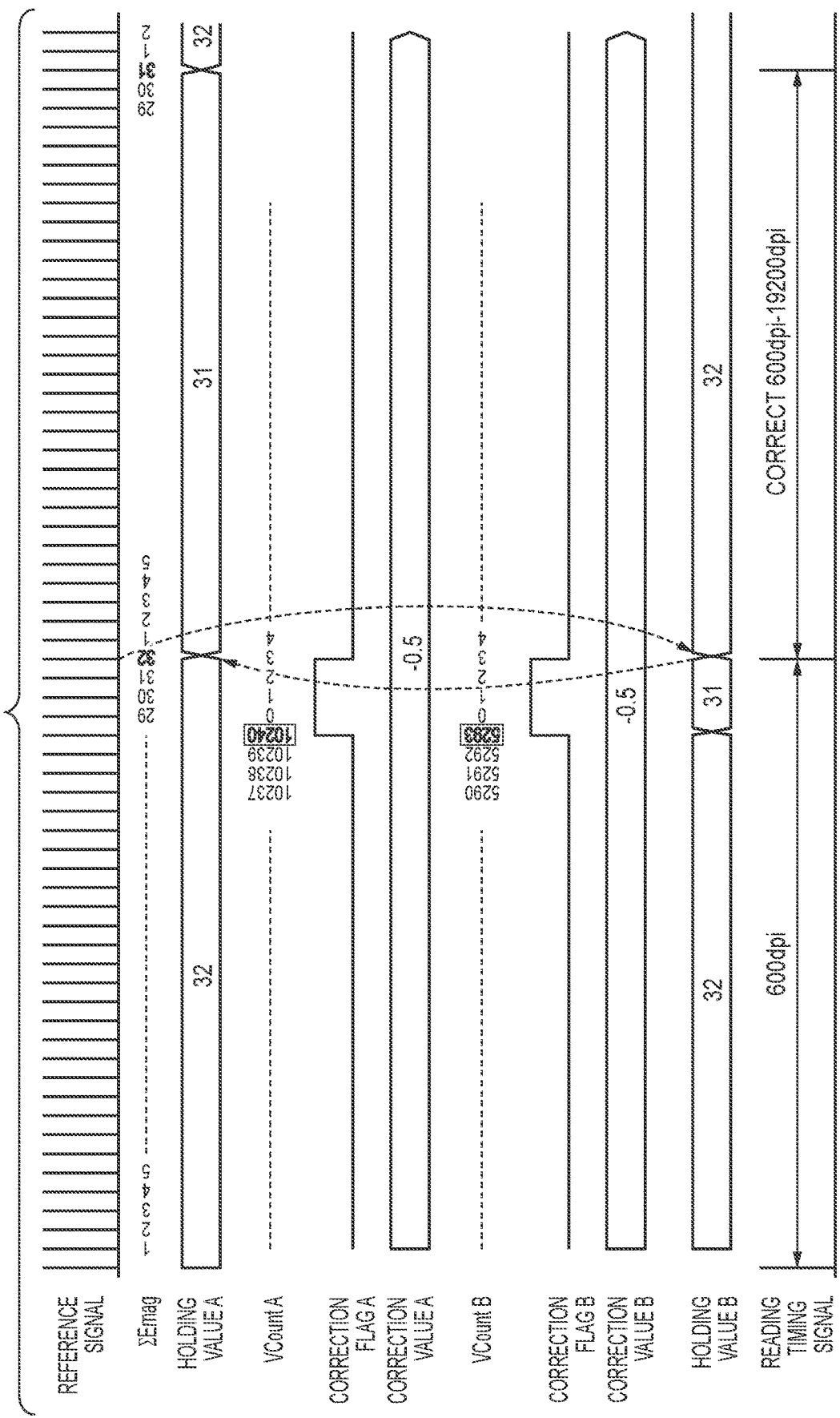
FIG. 28 is a timing chart showing an example of correction of the threshold.

FIG. 28 shows another example. In this example, the cycle setting value of the cycle holding unit 512A is 10,240, and the cycle setting value of the cycle holding unit 512B is 5,293. Correction values A and B are both −0.5, and a value (a value of 1 or less, a decimal fraction) equal to or lower than the resolution of a reference signal is set. In the example of FIG. 28 as well, when correction flags A and B are simultaneously set to H level, correction values A and B are simultaneously applied to the threshold T and set in the holding unit 515. However, the total correction amount of correction values A and B is −1. If the next reading timing signal is output, holding value A of the holding unit 505 is set to 31, and the threshold T is corrected from 32 to 31. It is possible to suppress an abrupt change of the threshold T.

Sixth Embodiment

Figure 29:
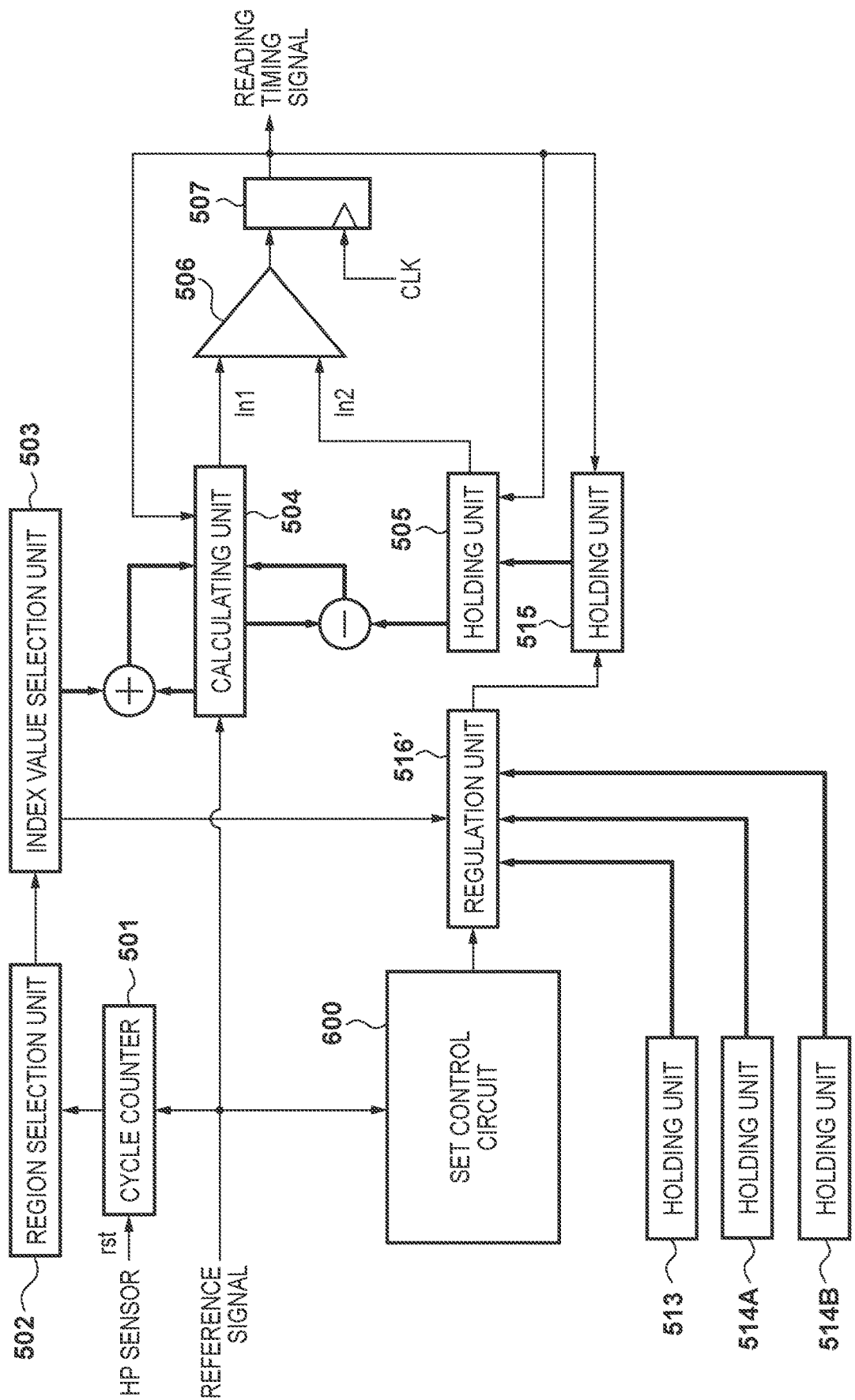
FIG. 29 is a functional block diagram of a timing control circuit.

FIG. 29 is a functional block diagram of a timing control circuit 16 according to this embodiment. The timing control circuit 16 according to this embodiment is formed by adding a correction regulation unit 516' to the timing control circuit 16 of the fifth embodiment shown in FIG. 25, and the remaining components are the same as those of the timing control circuit shown in FIG. 25.

Figure 30:
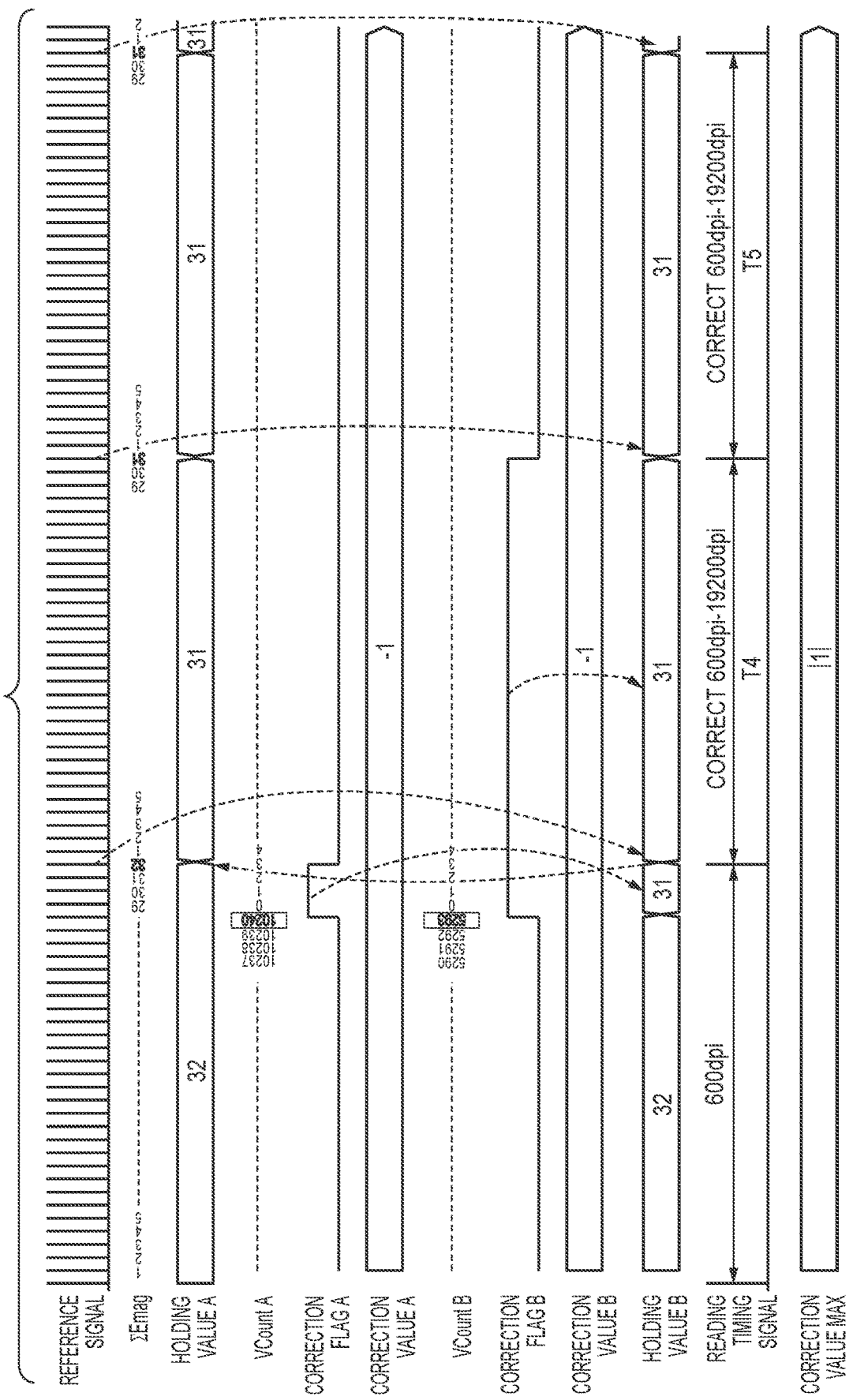
FIG. 30 is a timing chart showing an example of correction of a threshold.
Figure 31:
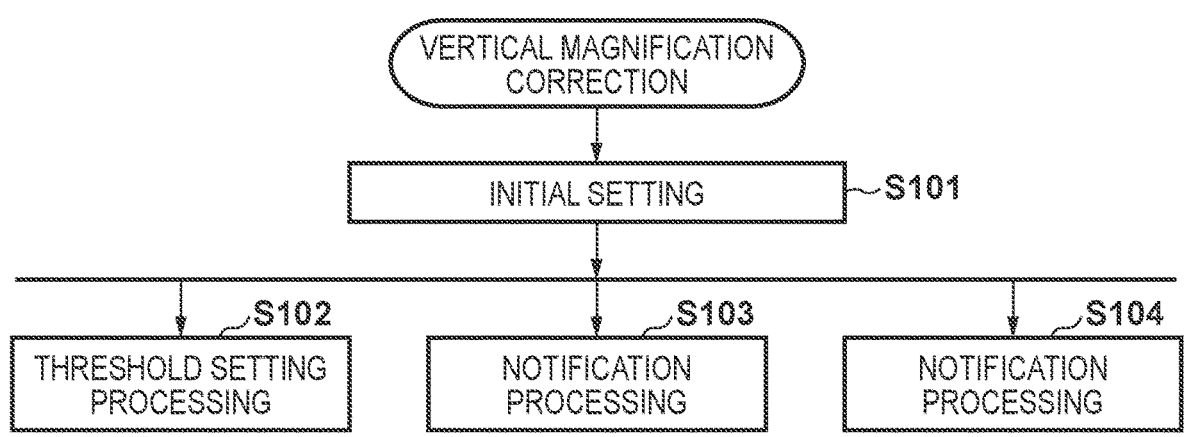
FIG. 31 is a flowchart illustrating an example of processing of a control unit.

The function of the correction regulation unit 516' will be described with reference to FIG. 30. FIG. 30 is a timing chart showing an example in which a threshold T is corrected. In this example, the cycle setting value of a cycle holding unit 512A is 10,240, and the cycle setting value of a cycle holding unit 512B is 5,293. Correction values A and B are both −1.

In the example shown in FIG. 30, correction flags A and B are simultaneously set to H level. However, if the total correction amount is equal to or larger than an upper limit value (correction value MAX (=III: absolute value of 1)), the correction regulation unit 516' applies only one correction value to the threshold T. In the example shown in FIG. 30, correction value A+correction value B=−2, and the absolute value is 1 or more. Therefore, the correction regulation unit 516' corrects the threshold T by correction value A, but reflects no correction value B.

This corrects the threshold T from 32 to 31 during a section T4 to the next reading timing signal. Correction flag B corresponding to correction value B which was not reflected is maintained at H level. Therefore, correction value B is applied during a section T5 to the next reading timing signal, and the threshold T is corrected from 32 to 31. This processing can reflect each of correction values A and B on correction of the threshold T while suppressing an abrupt change of the threshold T.

FIGS. 31 to 33B are flowcharts illustrating an example of processing of a vertical magnification correction operation according to this embodiment, which implements the example shown in FIG. 30, and show a processing example substituting for FIGS. 17, 18, and 20.

In step S101, initial setting is performed. A cycle setting value is set in each of the cycle holding units 512A and 512B. Correction value A is set in a holding unit 514A, and correction value B is set in a holding unit 514B. After that, threshold setting processing (step S102), notification processing (step S103), and notification processing (step S104) are executed simultaneously.

Figure 33B:
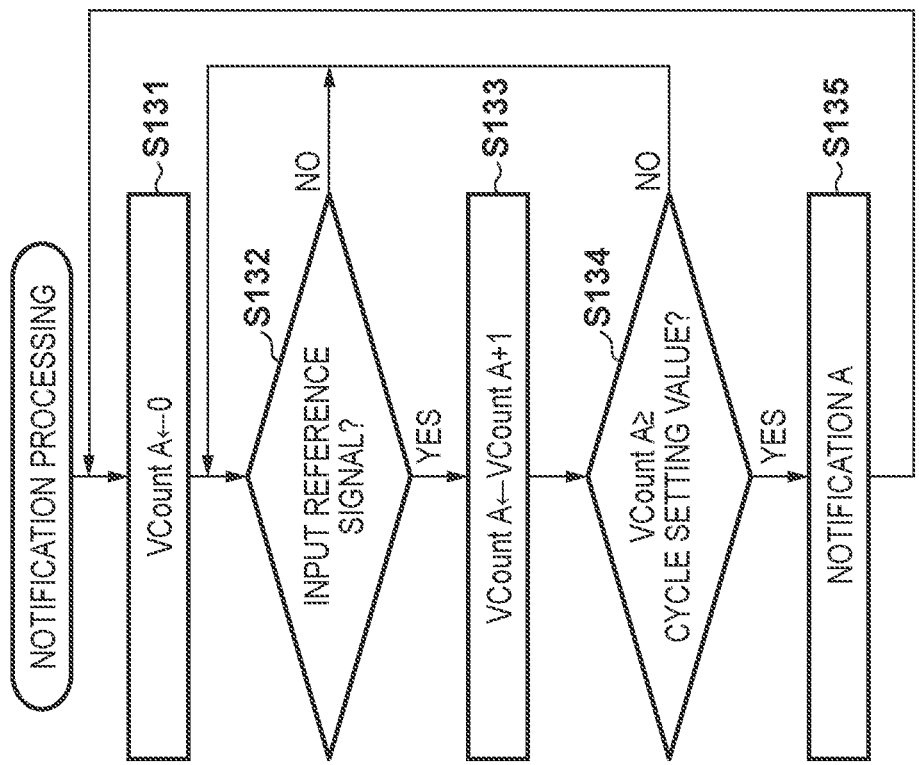
FIGS. 33A and 33B are flowcharts each illustrating an example of processing of the control unit.
Figure 33A:
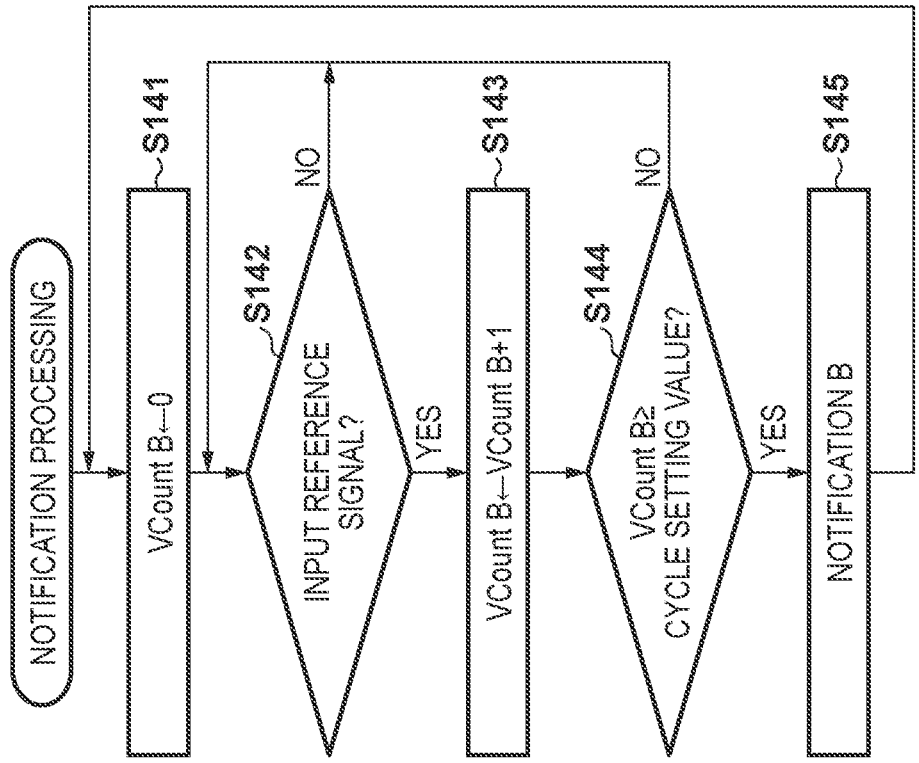

First, the notification processing of step S103 will be described with reference to FIG. 33A. In step S131, VCount A of the cycle counter 511A is cleared. If a reference signal is input in step S132, the process advances to step S133, and VCount A is incremented by one. In step S134, the cycle comparison unit 516A determines whether VCount A reaches the cycle setting value of the cycle holding unit 512A. If VCount A reaches the cycle setting value, the process advances to step S135; otherwise, the process returns to step S132. In step S135, the cycle comparison unit 516A outputs correction flag A (correction notification A) of H level, and notifies a holding unit 515 of arrival of the correction timing.

Next, the notification processing of step S104 will be described with reference to FIG. 33B. In step S141, VCount B of the cycle counter 511B is cleared. If the reference signal is input in step S142, the process advances to step S143, and VCount B is incremented by one. In step S144, the cycle comparison unit 516B determines whether VCount B reaches the cycle setting value of the cycle holding unit 512B. If VCount B reaches the cycle setting value, the process advances to step S145; otherwise, the process returns to step S142. In step S145, the cycle comparison unit 516B outputs correction flag B (correction notification B) of H level, and notifies the holding unit 515 of arrival of the correction timing.

Figure 32:
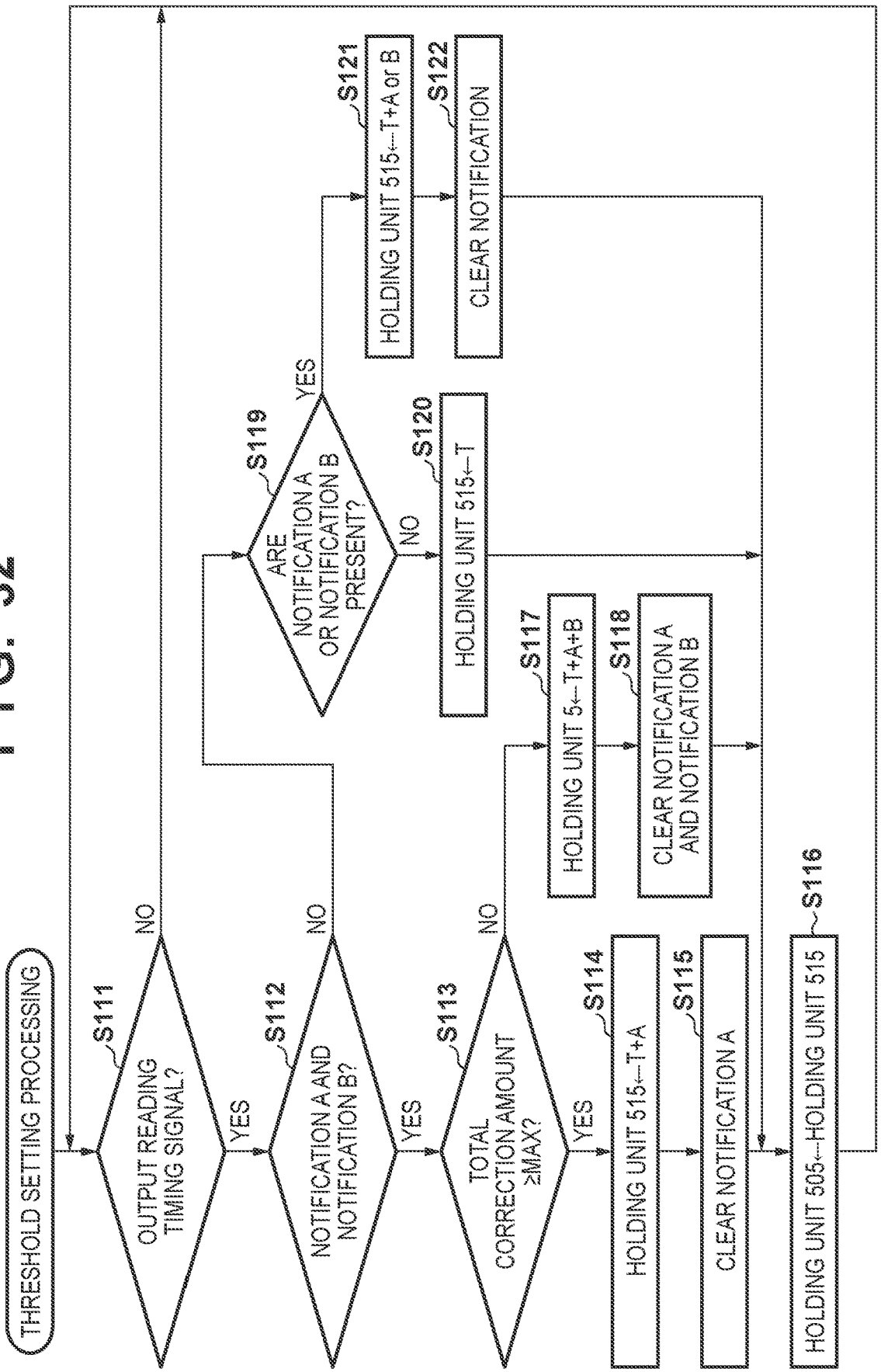
FIG. 32 is a flowchart illustrating an example of processing of the control unit.

Next, the threshold setting processing of step S102 will be described with reference to FIG. 32. In step S111, it is determined whether a reading timing signal is output. If the reading timing signal is output, it is determined in step S112 whether a set control circuit 600 notifies the holding unit 515 of both correction notifications A and B. That is, it is determined whether both correction values A and B are applied to the threshold T. If the holding unit 515 is notified of both correction notifications A and B, the process advances to step S113; otherwise, the process advances to step S119.

In step S113, it is determined whether the absolute value of the total correction amount (=correction value A+correction value B) is equal to or larger than the correction value MAX. If the total correction value is equal to or larger than the correction value MAX, the process advances to step S114; otherwise, the process advances to step S117. In step S114, a value (corrected threshold T=threshold T+correction value A) obtained by adding correction value A held in the holding unit 514A to the threshold T held in a holding unit 513 is held in the holding unit 515. Note that correction value A is prioritized in this example but correction value B may be prioritized. In step S115, correction notification A is cleared (correction flag A is set to L level). Correction notification B is not cleared (correction flag B is maintained at H level).

In step S117, a value (corrected threshold T=threshold T+correction value A+correction value B) obtained by adding correction value A held in the holding unit 514A and correction value B held in the holding unit 514B to the threshold T held in the holding unit 513 is held in the holding unit 515. In step S118, correction notifications A and B are cleared (correction flags A and B are set to L level).

In step S119, it is determined whether the set control circuit 600 notifies the holding unit 515 of one of correction notifications A and B. If the holding unit 515 is notified of one of correction notifications A and B, the process advances to step S121; otherwise, the process advances to step S120. In step S121, a value obtained by adding the correction value as the notification target to the threshold T held in the holding unit 513 is held in the holding unit 515. More specifically, if correction notification A is sent, a value (corrected threshold T=threshold T+correction value A) obtained by adding correction value A held in the holding unit 514A to the threshold T held in the holding unit 513 is held in the holding unit 515. If correction notification B is sent, a value (corrected threshold T=threshold T+correction value B) obtained by adding correction value B held in the holding unit 514B to the threshold T held in the holding unit 513 is held in the holding unit 515. In step S120, the threshold T held in the holding unit 513 is held in the holding unit 515.

In step S116, the value held in the holding unit 515 is held in a holding unit 505, and used as the threshold T. The above operation is repeated.

Seventh Embodiment

Next, another function of the correction regulation unit 516' of the sixth embodiment will be described with reference to FIG. 34. The arrangement of a timing control circuit 16 is the same as in the sixth embodiment.

FIG. 34 is a timing chart showing an example in which a threshold T is corrected. In this example, an operation waveform is shown when an index value Emag and a correction value of the threshold T are values in the same direction. The values in the same direction indicate that the correction value of the threshold T is a negative value for the index value Emag>1, and the correction value of the threshold T is a positive value for the index value Emag≤1. The cycle setting value of a cycle holding unit 512A is 10,240 and correction value A is −1.

In the example shown in FIG. 34, correction flag A (correction notification A) is set to H level, and 31 is set as holding value B in a holding unit 515. After that, in a case where the index value Emag is 1.03, during a section T6 between reading timing signals, if a reference signal is input 30 times (600 dpi to 9,600 dpi) on the basis of the resolution of the reference signal, the reading timing signal is output and a change from the threshold T (32) is large.

Figure 35:
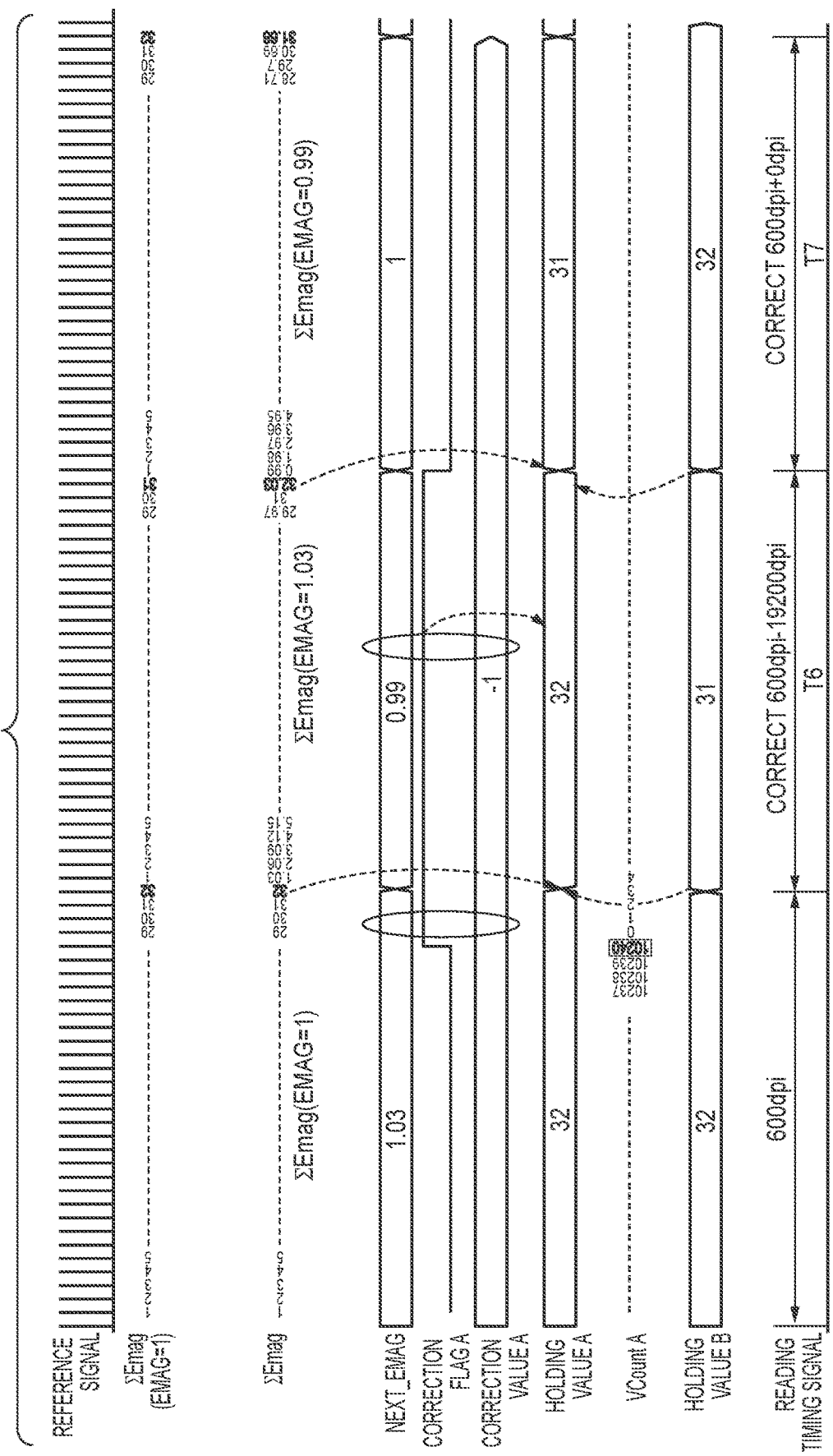
FIG. 35 is a timing chart showing an example of correction of the threshold.

To the contrary, FIG. 35 shows an example of selecting the threshold by a correction regulation unit 516'. In the example shown in FIG. 35, the cycle setting value of the cycle holding unit 512A is 10,240, and correction value A is −1. If correction flag A (correction notification A) transitions to H level, an index value (NEXT Emag) for generating a next reading timing signal is equal to or larger than 1, and thus correction value A is not reflected on the holding unit 515. If the next index value is smaller than 1 (NEXT Emag=0.99), correction value A is reflected on the holding unit 515. More specifically, a value (corrected threshold T=threshold T+correction value A) obtained by adding correction value A held in a holding unit 514A to the threshold T held in a holding unit 513 is held in the holding unit 515.

Thus, during the section T6 between the reading timing signals, if the reference signal is input 31 times (600 dpi-9,600 dpi) on the basis of the resolution of the reference signal, the reading timing signal is output. During a section T7, if the reference signal is input 32 times, the reading timing signal is output. It is possible to prevent an abrupt change of the threshold T.

Figure 36:
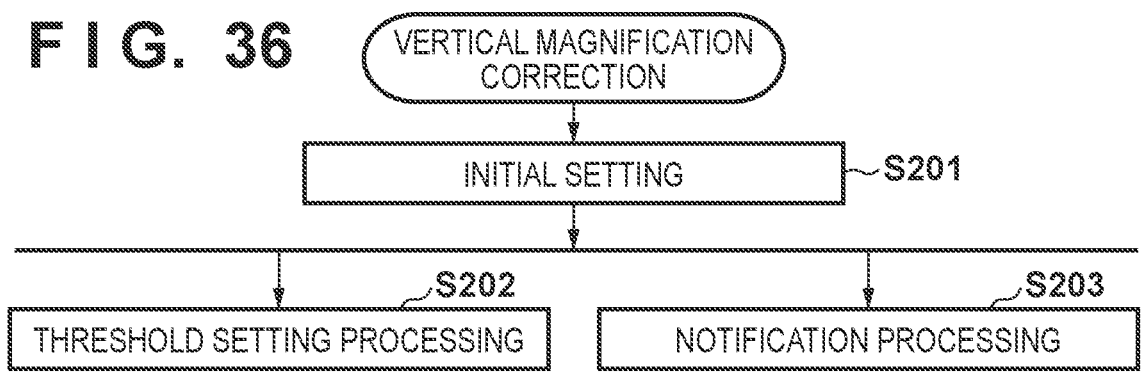
FIG. 36 is a flowchart illustrating an example of processing of a control unit.
Figure 37:
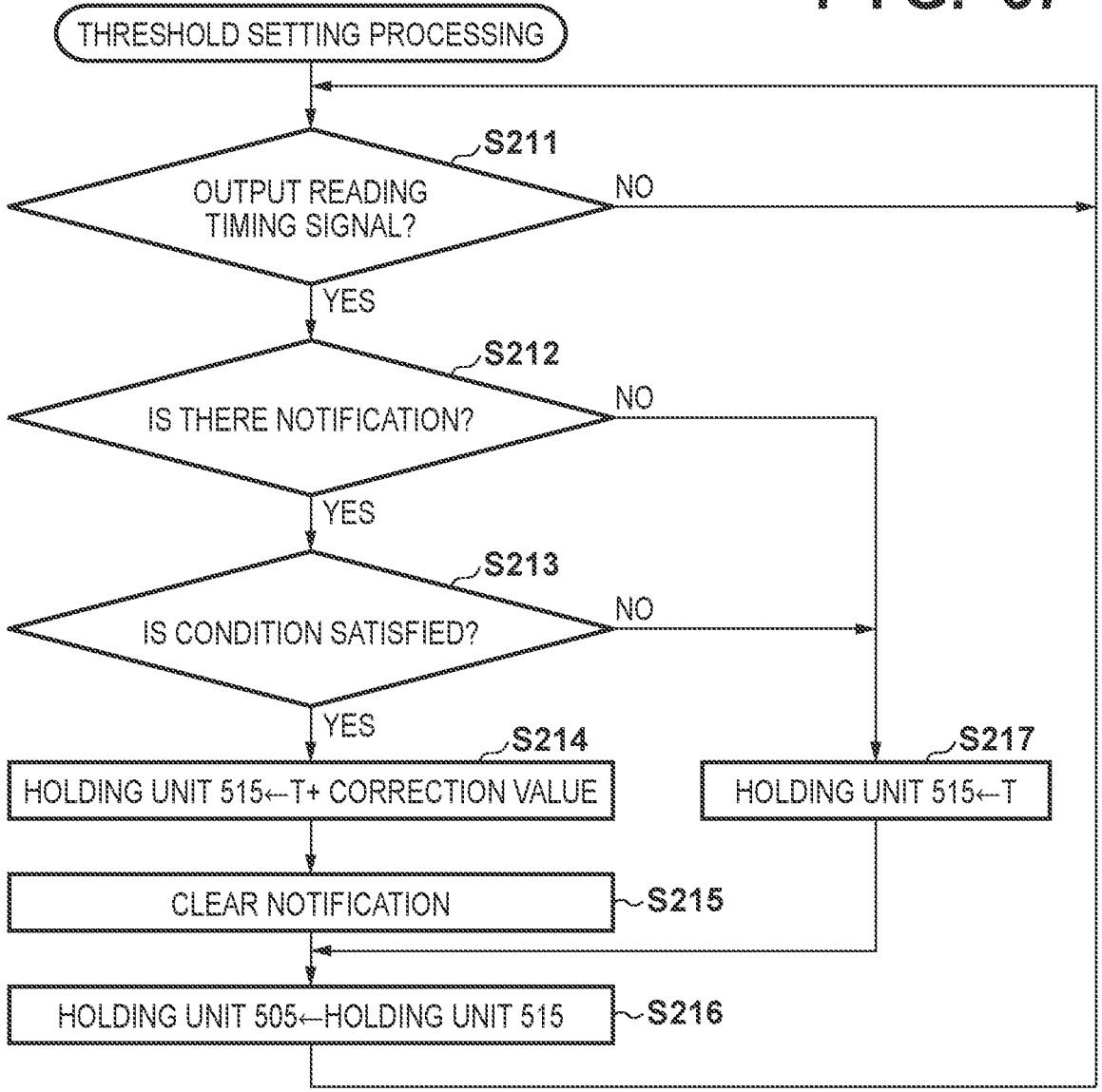
FIG. 37 is a flowchart illustrating an example of processing of the control unit.

FIGS. 36 to 38 are flowcharts illustrating an example of processing of a vertical magnification correction operation according to this embodiment, which implements the example shown in FIG. 35. Note that for the sake of descriptive simplicity, a description will be provided for a case of only vertical magnification correction with respect to correction value A with reference to FIGS. 36 to 38, unlike the example of FIGS. 31 to 33B. However, in a case where a plurality of vertical magnification correction operations are performed, such as a case where both correction values A and B are applied, the same processing is executed. Conversely, even in an arrangement in which the correction regulation unit 516' is provided in the arrangement of the timing control circuit 16 shown in FIG. 14 without using a plurality of correction values, the processing to be described below can be applied.

In step S201, initial setting is performed. At this time, a cycle setting value is set in the cycle holding unit 512A. Furthermore, correction value A is set in the holding unit 514A. After that, threshold setting processing (step S202) and notification processing (step S203) are simultaneously executed.

First, the notification processing of step S203 will be described with reference to FIG. 38. In step S221, VCount A of the cycle counter 511A is cleared. If the reference signal is input in step S222, the process advances to step S223, and VCount A is incremented by one. In step S224, a cycle comparison unit 516A determines whether VCount A reaches the cycle setting value of the cycle holding unit 512A. If VCount A reaches the cycle setting value, the process advances to step S225; otherwise, the process returns to step S222. In step S225, the cycle comparison unit 516A outputs correction flag A (correction notification A) of H level, and notifies the holding unit 515 of arrival of the correction timing.

Next, the threshold setting processing of step S202 will be described with reference to FIG. 37. In step S211, it is determined whether the reading timing signal is output. If the reading timing signal is output, it is determined in step S212 whether a set control circuit 600 notifies the holding unit 515 of correction notification A. If the holding unit 515 is notified of correction notification A, the process advances to step S213; otherwise, the process advances to step S217.

In step S213, it is determined whether predetermined conditions are satisfied. One of the predetermined conditions is that correction value A<0 and index value (NEXT EMAG) for the next reading timing signal≤1 (condition 1). Another one of the predetermined conditions is that correction value A>0 and index value (NEXT EMAG) for the next reading timing signal>1 (condition 2). If one of conditions 1 and 2 is satisfied, the process advances to step S214; otherwise, the process advances to step S217. That is, in step S213, it is determined that reflected contents of the index value and vertical magnification correction by correction value A do not overlap each other.

In step S214, a value (corrected threshold T=threshold T+correction value A) obtained adding correction value A held in the holding unit 514A to the threshold T held in the holding unit 513 is held in the holding unit 515. In step S215, correction notification A is cleared (correction flag A is set to L level). In step S217, the threshold T held in the holding unit 513 is held in the holding unit 515. In step S216, the value held in the holding unit 515 is held in a holding unit 505, and used as the threshold T. The above operation is repeated.

As described above, according to this embodiment, if reflection timings of the index value and the correction value of the threshold T overlap each other, it is possible to prevent an abrupt increase/decrease of the reading timing, thereby minimizing the influence on an image. In particular, this is effective in an arrangement in which when a medium 100 enters a conveyance roller 7, a conveyance state is changed from a state in which the medium 100 is conveyed only by a conveyance roller 6, as in this embodiment, and it is possible to make setting of vertical magnification correction easy.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as 'a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-102064, which was filed on Jun. 24, 2022 and which is hereby incorporated by reference herein in its entirety.

What is claimed is:
1. A reading apparatus comprising:
a conveyance roller configured to convey a medium;
a reading unit configured to read an image of the medium conveyed by the conveyance roller;
a detection unit configured to detect a rotation phase of the conveyance roller;
a storage unit configured to store index values, each index value being associated with the rotation phase of the conveyance roller and corresponding to a conveyance amount of the conveyance roller per unit rotation angle; and
a timing control circuit configured to select the index value based on a detection result of the detection unit and to control a reading timing of the reading unit based on a result of comparing a cumulative value of selected index values with a threshold corresponding to a reading resolution.

2. The apparatus according to claim 1, wherein the index value is set for each of a plurality phase regions of the conveyance roller.

3. The apparatus according to claim 1, wherein
the detection unit outputs a reference signal per rotation of the unit rotation angle of the conveyance roller,
the threshold corresponds to a count value of the reference signal, and
the index value is a correction value obtained by correcting one count value of the reference signal in accordance with the conveyance amount of the conveyance roller.

4. The apparatus according to claim 1, wherein when the cumulative value reaches the threshold, the timing control circuit outputs a reading timing signal to the reading unit.

5. The apparatus according to claim 4, wherein when the cumulative value reaches the threshold, the timing control circuit subtracts the threshold from the cumulative value.

6. The apparatus according to claim 4, wherein
when the reading timing signal is output after a lapse of a predetermined cycle corresponding to rotation of the conveyance roller, the timing control circuit compares the cumulative value with a corrected threshold of the threshold until a next reading timing signal is output.

7. The apparatus according to claim 6, wherein the predetermined cycle and/or a correction amount of the threshold is set in accordance with a type of the medium.

8. The apparatus according to claim 6, wherein the predetermined cycle and/or a correction amount of the threshold is set in accordance with a use environment of the reading apparatus.

9. The apparatus according to claim 6, wherein
the reading unit includes a plurality of sensing units separated in a conveyance direction of the conveyance roller,
the timing control circuit includes a count unit configured to repeat the predetermined cycle, and
an initial value of the count unit is changed in a predetermined case.

10. The apparatus according to claim 9, further comprising a second conveyance roller on a downstream side of the conveyance roller in the conveyance direction of the medium,
wherein the predetermined case is a case where the medium reaches the second conveyance roller.

11. The apparatus according to claim 6, wherein the timing control circuit includes a regulation unit configured to regulate correction of the threshold.

12. The apparatus according to claim 11, wherein the regulation unit selects presence/absence of regulation based on the index value and a correction value of the threshold.

13. The apparatus according to claim 4, wherein
when the reading timing signal is output after a lapse of a first cycle corresponding to rotation of the conveyance roller, the timing control circuit compares the cumulative value with a corrected threshold of the threshold corrected by a first correction value until a next reading timing signal is output, and when the reading timing signal is output after a lapse of a second cycle corresponding to rotation of the conveyance roller, the timing control circuit compares the cumulative value with a corrected threshold of the threshold corrected by a second correction value until a next reading timing signal is output.

14. The apparatus according to claim 13, wherein the timing control circuit includes a regulation unit configured to regulate correction of the threshold by the first correction value and the second correction value simultaneously.

15. The apparatus according to claim 14, wherein in a case where one total correction amount for the threshold is not smaller than an upper limit value, the regulation unit regulates the correction of the threshold.

16. The apparatus according to claim 14, wherein the regulation unit regulates the correction of the threshold by selecting one of the first correction value and the second correction value and correcting the threshold.

17. The apparatus according to claim 1, wherein the threshold is changed in accordance with a change of the reading resolution.

18. The apparatus according to claim 1, further comprising at least one processor configured to set the index values based on a result of reading a calibration chart by the reading unit and to store the index values in the storage unit.

19. The apparatus according to claim 1, wherein
the reading unit includes a plurality of sensing units separated in a conveyance direction of the conveyance roller, and
each sensing unit includes a plurality of reading elements arrayed in a direction intersecting the conveyance direction.

20. A control method for a reading apparatus including a conveyance roller configured to convey a medium, a reading unit configured to read an image of the medium conveyed by the conveyance roller, a detection unit configured to detect a rotation phase of the conveyance roller, and a storage unit configured to store index values, each index value being associated with the rotation phase of the conveyance roller and corresponding to a conveyance amount of the conveyance roller per unit rotation angle, the method comprising:
selecting the index value based on a detection result of the detection unit; and
controlling a reading timing of the reading unit based on a result of comparing a cumulative value of selected index values with a threshold corresponding to a reading resolution.

* * * * *